(12) United States Patent
Jun et al.

(10) Patent No.: US 11,563,954 B2
(45) Date of Patent: Jan. 24, 2023

(54) METHOD AND DEVICE FOR IMAGE ENCODING/DECODING ON BASIS OF ASYMMETRIC SUB-BLOCK

(71) Applicant: ELECTRONICS AND TELECOMMUNICATIONS RESEARCH INSTITUTE, Daejeon (KR)

(72) Inventors: Dong San Jun, Daejeon (KR); Ha Hyun Lee, Seoul (KR); Jung Won Kang, Daejeon (KR); Hyun Suk Ko, Daejeon (KR); Sung Chang Lim, Daejeon (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 6 days.

(21) Appl. No.: 16/758,121

(22) PCT Filed: Oct. 26, 2018

(86) PCT No.: PCT/KR2018/012861
§ 371 (c)(1),
(2) Date: Apr. 22, 2020

(87) PCT Pub. No.: WO2019/083334
PCT Pub. Date: May 2, 2019

(65) Prior Publication Data
US 2020/0288150 A1    Sep. 10, 2020

(30) Foreign Application Priority Data

Oct. 26, 2017   (KR) .................... 10-2017-0140206

(51) Int. Cl.
*H04N 19/119*   (2014.01)
*H04N 19/176*   (2014.01)
(Continued)

(52) U.S. Cl.
CPC ......... *H04N 19/176* (2014.11); *H04N 19/119* (2014.11); *H04N 19/159* (2014.11); *H04N 19/44* (2014.11)

(58) Field of Classification Search
CPC ....... H04N 19/119; H04N 19/44; H04N 19/46
See application file for complete search history.

(56) References Cited

U.S. PATENT DOCUMENTS 9,288,493 B2 * 3/2016  Oh ...................... H04N 19/137
9,313,494 B2 * 4/2016  Zheng ................... H04N 19/11
(Continued)

FOREIGN PATENT DOCUMENTS

KR      10-0772576 B1    11/2007
KR   10-2012-0086131 A    8/2012
(Continued)

OTHER PUBLICATIONS

A fast approach for geometry-adaptive block partitioning—2009. (Year: 2009).*

(Continued)

*Primary Examiner* — Luis Perez-Fuentes
(74) *Attorney, Agent, or Firm* — NSIP Law

(57) ABSTRACT

The present invention relates to a video encoding/decoding method and apparatus. The video decoding method according to the present invention may comprise dividing a coding unit into a plurality of sub-units according to a block division structure and performing decoding based on the sub-unit, wherein the block division structure is a block division structure in which division is performed so as to include at least one sub-unit having a predetermined block form other than square and rectangle forms.

13 Claims, 14 Drawing Sheets

(51) Int. Cl.
*H04N 19/159* (2014.01)
*H04N 19/44* (2014.01)

(56) References Cited

U.S. PATENT DOCUMENTS

| | | | | |
|---|---|---|---|---|
| 9,736,489 | B2* | 8/2017 | Wang | H04N 19/52 |
| 9,826,244 | B2* | 11/2017 | Seregin | H04N 19/52 |
| 10,638,129 | B2* | 4/2020 | Park | H04N 19/109 |
| 10,708,589 | B2* | 7/2020 | Mishurovskiy | H04N 19/167 |
| 10,715,811 | B2* | 7/2020 | Kim | H04N 19/198 |
| 11,102,517 | B2* | 8/2021 | Lim | H04N 19/176 |
| 2012/0147961 | A1* | 6/2012 | Guo | H04N 19/147 375/240.16 |
| 2013/0215968 | A1 | 8/2013 | Jeong et al. | |
| 2014/0286395 | A1* | 9/2014 | Lee | H04N 19/176 375/240.02 |
| 2015/0103897 | A1 | 4/2015 | Kim et al. | |
| 2016/0330476 | A1 | 11/2016 | Zheng | |
| 2017/0034529 | A1* | 2/2017 | Lin | H04N 19/176 |
| 2017/0150156 | A1 | 5/2017 | Zhang et al. | |
| 2018/0227593 | A1* | 8/2018 | Chen | H04N 19/176 |
| 2019/0182491 | A1* | 6/2019 | Lee | H04N 19/51 |
| 2020/0021828 | A1* | 1/2020 | Cho | H04N 19/91 |
| 2020/0068218 | A1* | 2/2020 | Chen | H04N 19/105 |
| 2020/0322628 | A1* | 10/2020 | Lee | H04N 19/109 |
| 2021/0195185 | A1* | 6/2021 | Raut | H04N 19/503 |

FOREIGN PATENT DOCUMENTS

| | | |
|---|---|---|
| KR | 10-2014-0111139 A | 9/2014 |
| KR | 10-2016-0095932 A | 8/2016 |
| KR | 10-2016-0118300 A | 10/2016 |
| KR | 10-2017-0023921 A | 3/2017 |
| WO | WO 2015/133838 A1 | 9/2015 |

OTHER PUBLICATIONS

Overlapped block motion compensation in TMuC; Chen—2010. (Year: 2010).*
Block partitioning structure in HEVC standard; Kim—2012. (Year: 2012).*
USPTO Library for NPL query; 2022. (Year: 2022).*
CU-based Merge Candidate List Construction; Kim—2011 (Year: 2011).*
Fast encoding algorithms for geometry-adapt block partitioning; Bordes—2011. (Year: 2011).*
International Search Report dated Jan. 25, 2019 in corresponding International Patent Application No. PCT/KR2018/012861 (3 pages in English, 3 pages in Korean).

* cited by examiner

METHOD AND DEVICE FOR IMAGE ENCODING/DECODING ON BASIS OF ASYMMETRIC SUB-BLOCK

CROSS REFERENCE TO RELATED APPLICATIONS

This application is a U.S. National Stage Application of International Application No. PCT/KR2018/012861, filed on Oct. 26, 2018, which claims the benefit under 35 USC 119(a) and 365(b) of Korean Patent Application No. 10-2017-0140206, filed on Oct. 26, 2017 in the Korean Intellectual Property Office, the entire disclosure of which is incorporated herein by reference for all purposes.

TECHNICAL FIELD

The present invention relates to a method and apparatus for encoding/decoding a video, and a recording medium storing a bitstream. More particularly, the present invention relates to a method and apparatus for encoding/decoding a video on the basis of at least one asymmetric sub-block.

BACKGROUND ART

Recently, demands for high-resolution and high-quality videos, such as high-definition (HD) and ultrahigh-definition (UHD) videos, have increased in various fields of applications. As video data has higher resolution and higher quality, the amount of data is increased relative to existing video data. Accordingly, when video data is transferred using media such as existing wired and wireless broad band lines or is stored in existing storage media, transfer and storage costs increase. In order to solve these problems occurring with an increase in resolution and quality of video data, high-efficiency video compression techniques may be utilized.

Video compression technology include various techniques, such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Video data may be effectively compressed and transferred or stored using such video compression techniques.

In a conventional video encoding/decoding method and apparatus, an encoding/decoding block always has a square form or rectangle form or both, and is divided by using a quad-tree form. Accordingly, encoding/decoding considering the local characteristics in a video is limited.

DISCLOSURE

Technical Problem

An object of the present invention is to provide a method and apparatus for video encoding/decoding using various asymmetric sub-block division structures.

In addition, another object of the present invention is to provide a method and apparatus for video encoding/decoding, wherein prediction is independently performed for asymmetric sub-blocks.

In addition, still another object of the present invention is to provide a recording medium storing a bitstream generated by a method and apparatus for video encoding/decoding of the present invention.

In addition, still another object of the present invention is to provide a method and apparatus for asymmetric sub-block based encoding/decoding a video, wherein at least one block division structure of a block division structure of a binary-tree after quad-tree form, a block division structure of a combined quad-tree and binary-tree form, and a block division structure of a separated PU/TU tree is used to improve encoding/decoding efficiency.

In addition, still another object of the present invention is to provide a method and apparatus for video encoding/decoding, wherein a current block is divided into at least one asymmetric sub-block and differently performing prediction for each asymmetric sub-block.

Technical Solution

A method of decoding an image according to the present invention, the method may comprise dividing a coding unit into a plurality of sub-units according to a block division structure; and performing decoding based on the sub-unit, wherein the block division structure is a block division structure in which division is performed so as to include at least one sub-unit having a predetermined block form other than square and rectangle forms.

In the method of decoding an image according to the present invention, wherein the performing of decoding based on the sub-unit includes performing decoding by performing at least one of intra-prediction and inter-prediction based on the sub-unit.

In the method of decoding an image according to the present invention, wherein the performing of decoding based on the sub-unit includes performing decoding by performing at least one of inverse-transform and dequantization based on the sub-unit.

In the method of decoding an image according to the present invention, wherein the block division structure is a block division structure in which the coding unit is divided so as to include a triangle-form sub-unit.

In the method of decoding an image according to the present invention, wherein the triangle form is at least one of a triangle form obtained by dividing the coding unit by a diagonal boundary from the left-upper to the right-lower of the coding unit, and a triangle form obtained by dividing the coding unit by a diagonal boundary from the right-upper to the left-lower of the coding unit.

In the method of decoding an image according to the present invention, wherein the block division structure is determined based on a flag representing whether or not the coding unit is divided.

In the method of decoding an image according to the present invention, wherein the block division structure is determined based on a flag representing whether or not the coding unit is divided and an index representing a division type of the sub-unit.

In the method of decoding an image according to the present invention, wherein the division type of the sub-unit represent a division direction of the sub-unit.

Also, A method of encoding an image according to the present invention, the method may comprise dividing a coding unit into a plurality of sub-units according to a block division structure; and performing encoding based on the sub-unit, wherein the block division structure is a block division structure in which division is performed so as to include at least one sub-unit having a predetermined block form other than square and rectangle forms.

In the method of encoding an image according to the present invention, wherein the performing of encoding based on the sub-unit includes performing encoding by performing at least one of intra-prediction and inter-prediction based on the sub-unit.

In the method of encoding an image according to the present invention, wherein the performing of encoding based on the sub-unit includes performing encoding by performing at least one of transform and quantization based on the sub-unit.

In the method of encoding an image according to the present invention, wherein the block division structure is a block division structure in which the coding unit is divided so as to include a triangle-form sub-unit.

In the method of encoding an image according to the present invention, wherein the triangle form is at least one of a triangle form obtained by dividing the coding unit by a diagonal boundary from the left-upper to the right-lower of the coding unit, and a triangle form obtained by dividing the coding unit by a diagonal boundary from the right-upper to the left-lower of the coding unit.

In the method of encoding an image according to the present invention, wherein the block division structure is determined based on a flag representing whether or not the coding unit is divided.

In the method of encoding an image according to the present invention, wherein the block division structure is determined based on a flag representing whether or not the coding unit is divided and an index representing a division type of the sub-unit.

In the method of encoding an image according to the present invention, wherein the division type of the sub-unit represents a division direction of the sub-unit.

Also, a computer-readable recording medium according to the present invention may store a bitstream generated by an image encoding method according to the present invention.

Advantageous Effects

As described above, the present invention, according to the present invention, there is provided a method and apparatus for video encoding/decoding using various asymmetric sub-block division structures.

In addition, according to the present invention, there is provided a method and apparatus for video encoding/decoding, wherein prediction can be independently performed for asymmetric sub-blocks.

In addition, according to the present invention, there is provided a recording medium storing a bitstream generated by a method and apparatus for video encoding/decoding of the present invention.

In addition, according to the present invention, video encoding and decoding efficiency can be improved.

MODE FOR INVENTION

Figure 1:
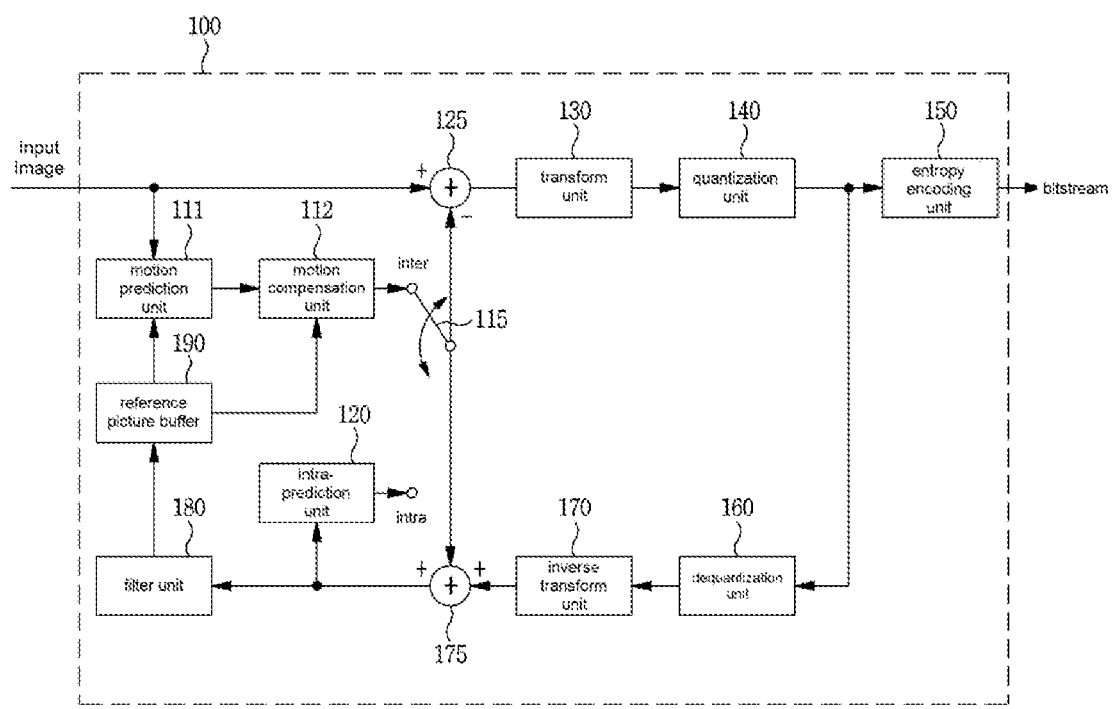
FIG. 1 is a block diagram showing a configuration of an embodiment of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block, a prediction unit, a prediction block, a residual unit, a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
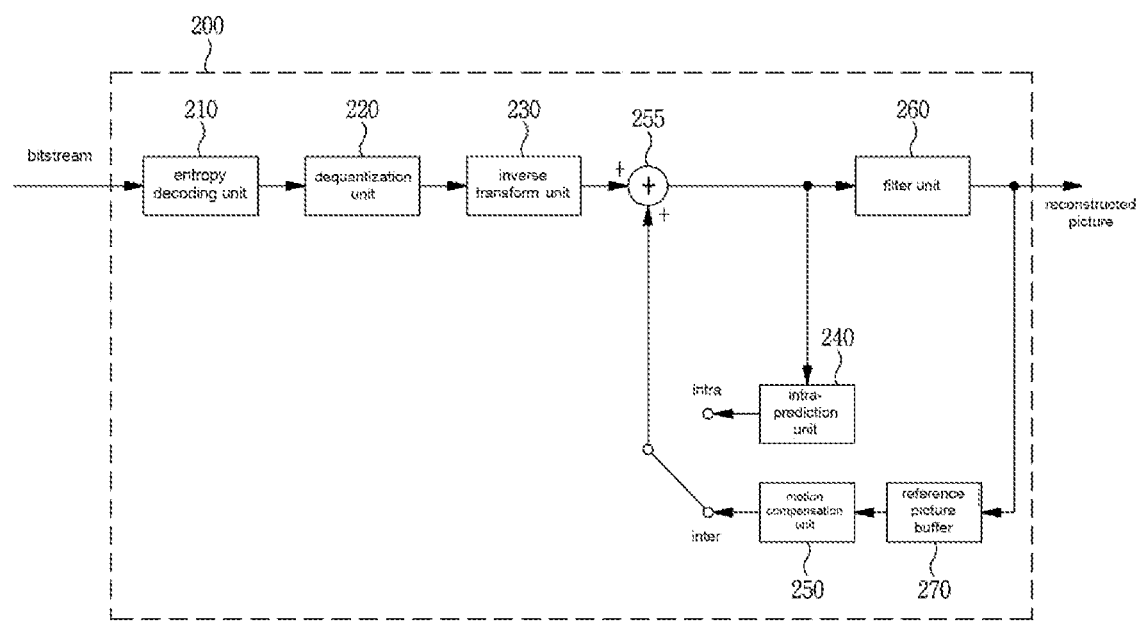
FIG. 2 is a block diagram of an embodiment of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
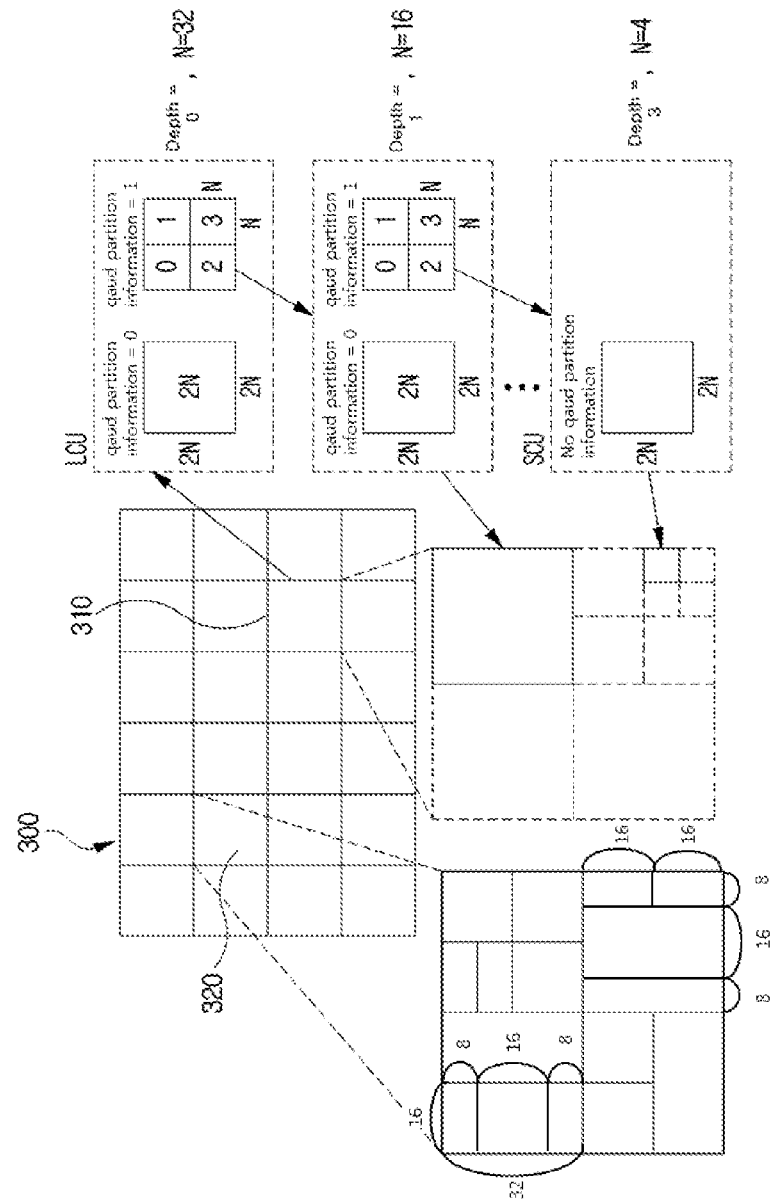
FIG. 3 is a view schematically showing a division structure of a video when encoding and decoding the video.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
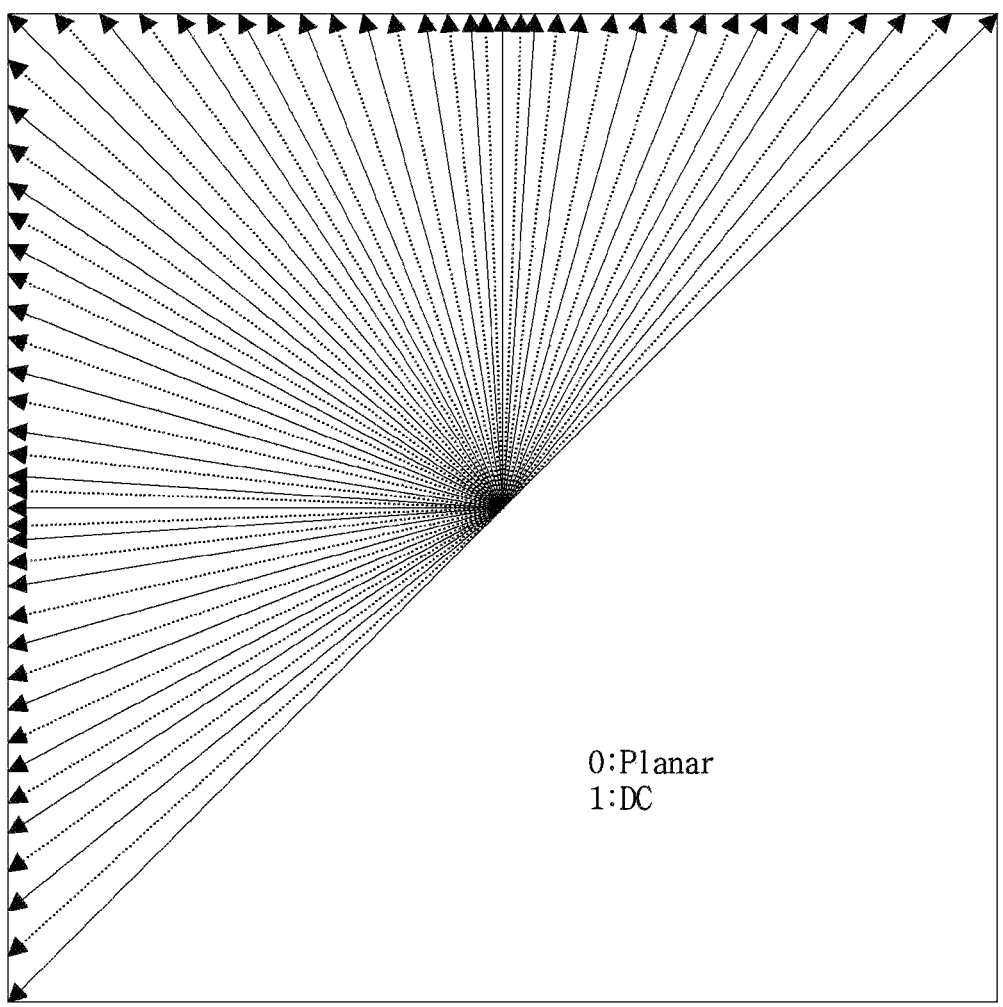
FIG. 4 is a view showing an embodiment of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
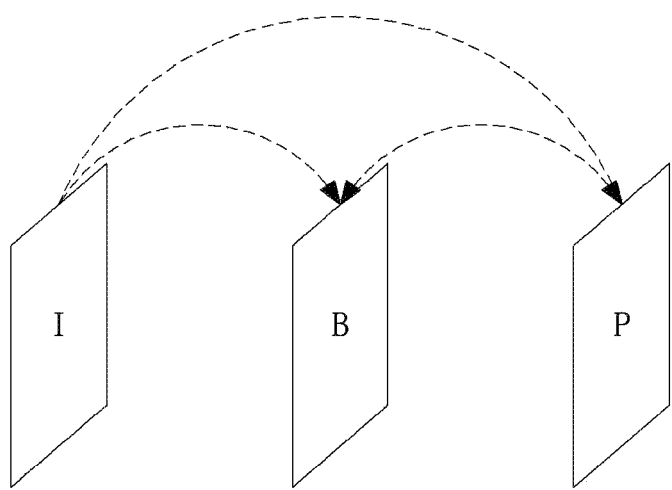
FIG. 5 is a view showing an embodiment of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are present in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the motion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
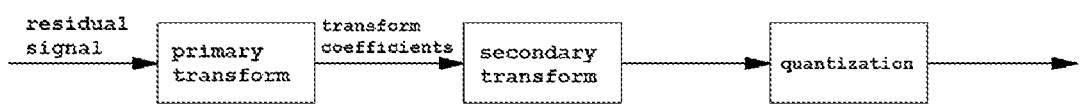
FIG. 6 is a view showing transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, the transform scheme may be determined through signaling of transform information.

Since the residual signal is quantized through the primary transform and the secondary transform, a quantized-level signal (quantization coefficients) is generated. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Hereinafter, referring to FIGS. 7 to 18, a method of performing sub-block division or deriving prediction information between sub-blocks or both according to an embodiment of the present invention will be described.

Figure 7:
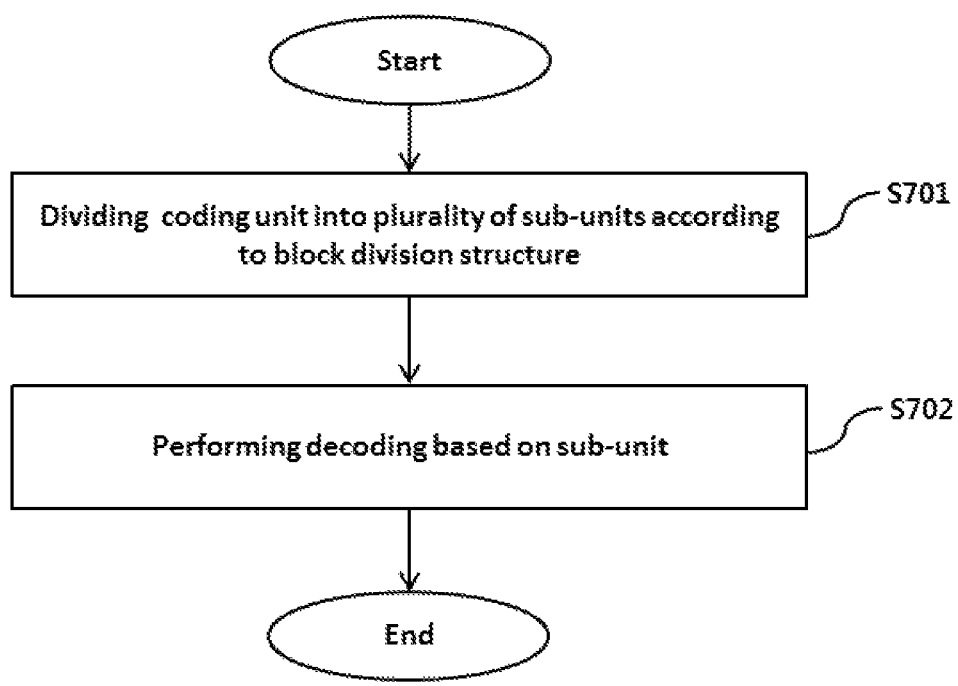
FIG. 7 is a view of a flowchart showing a method of decoding a video according to an embodiment of the present invention.

FIG. 7 is a view of a flowchart showing a method of decoding a video according to an embodiment of the present invention.

Referring to FIG. 7, in S701, the decoder may divide a coding unit into a plurality of sub-units according to a block division structure.

Meanwhile, a block division structure may be a block division structure where division is performed such that at least one sub-unit having a predetermined block form is included other than square and rectangular forms.

Meanwhile, the block division structure may be a block division structure where division is performed such that the coding unit is divided to include a sub-unit having a triangular form.

Meanwhile, the triangular form may be at least one of a triangular form obtained by dividing by a diagonal boundary from the left-upper to the right-lower of the coding unit, and a triangular form obtained by dividing by a diagonal boundary from the right-upper to the left-lower of the coding unit.

Meanwhile, the block division structure may be determined on the basis of a flag representing whether or not the coding unit is divided.

Meanwhile, the block division structure may be determined on the basis of a flag representing whether or not the coding unit is divided, and an index representing a division type of the sub-unit.

Meanwhile, a division type of the sub-unit may represent a division direction of the sub-unit.

In addition, in S702, the decoder may perform decoding based on a sub-unit.

Meanwhile, the decoder may perform decoding by performing at least one of intra-prediction and inter-prediction based on a sub-unit. In addition, the decoder may perform decoding by performing at least one of inverse-transform and dequantization based on a sub-unit. In addition, the decoder may perform decoding in a unit of a lowest level sub-unit of the sub-unit.

A method of deriving inter-prediction information will be described.

When performing inter-prediction of a current block according to a merge mode, a merge candidate may include a spatial merge candidate, a temporal merge candidate, a sub-block based temporal merge candidate, a sub-block based temporal spatial combined merge candidate, a combined merge candidate, a zero merge candidate, etc. A merge candidate may include inter-prediction information of at least one of an inter-prediction indicator, a reference video index of a reference video list, a motion vector, and a picture order count (POC).

A method of deriving a spatial merge candidate will be described.

From a reconstructed block spatially adjacent to a current block to be encoded/decoded, a spatial merge candidate of the current block may be derived.

Figure 8:
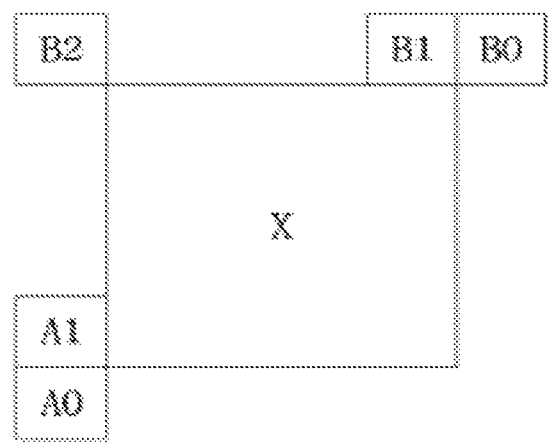
FIG. 8 is a view showing a method of deriving a spatial merge candidate according to an embodiment of the present invention.

FIG. 8 is a view showing a method of deriving a spatial merge candidate according to an embodiment of the present invention.

Referring to FIG. 8, motion information may be derived from a block corresponding to at least one of a block A1 positioned at the left of a current block X to be encoded/decoded, a block B1 positioned at the upper of the current block X, a block B0 positioned at the right upper corner of the current block X, a block A0 positioned at the left lower corner of the current block X, and a block B2 positioned at the left upper corner of the current block X. In addition, a spatial merge candidate of the current block may be determined by using the derived motion information. In an example, the derived motion information may be used as a spatial merge candidate of the current block.

A spatial merge candidate may mean a block reconstructed spatially adjacent to a block to be encoded/decoded (or, motion information of a reconstructed block that is spatially adjacent). The block may have a square form or a non-square form. In addition, a block reconstructed spatially adjacent to a block to be encoded/decode may be divided by a unit of a lower level block (sub-block). At least one spatial merge candidate may be derived for each lower level block.

Deriving a spatial merge candidate may mean deriving a spatial merge candidate and adding the same to a merge candidate list. Herein, each of merge candidates added to a merge candidate list may have different motion information.

A spatial merge candidate may be derived up to maxNumSpatialMergeCand. Herein, maxNumSpatialMergeCand may be a positive integer including 0. In an example, maxNumSpatialMVPCand may be 5. MaxNumMergeCand may be a maximum number of merge candidates that may be included in a merge candidate list, and may be a positive integer including 0. In addition, numMergeCand may mean a number of merge candidates included in a practical merge candidate list within a predefined MaxNumMergeCand. Meanwhile, use of maxNumSpatialMergeCand, numMergeCand, MaxNumMergeCand does not limit the scope of the present invention. Encoding/decoding apparatuses may use the above information by using a parameter value having the same meaning with numMergeCand, and MaxNumMergeCand.

A method of deriving a temporal merge candidate will be described.

A temporal merge candidate may be derived from a block temporally adjacent to a current block to be encoded/decoded, that is, a block that is reconstructed in a reference video (reference picture). The reference video temporally adjacent to the current block may mean a co-located video (co-located picture). Information of the co-located video (in an example, at least one of an inter-prediction indicator, a reference video index, and motion vector information indicating a co-located block of the current block) may be transmitted from the encoder to the decoder in at least one unit of a coding block unit within a sequence/picture/slice/tile/CTU/CU. Alternatively, information of the co-located video may be implicitly derived in the encoder/decoder by using at least one a hierarchy according to an encoding/decoding order, motion information of a current block or temporally spatially adjacent blocks that are already encoded/decoded or both (in an example, an inter-prediction indicator or a reference video index or both), an inter-prediction indicator of a co-located video in a sequence/picture/slice/tile level, and reference video index information.

Herein, when deriving a temporal merge candidate of a current block, selecting a co-located video or a position of a co-located block within the co-located video or both may be selected by using at least one of motion information of temporally spatially adjacent blocks that are already encoded/decoded on the basis of a position of the current block. Thus, a block at an identical position within the co-located video may be selected. Alternatively, from an identical position of a current block within a selected co-located video, a co-located block of the current block may be determined as a block at a position by moving by a motion vector obtained by using at least one of motion vector information of temporally spatially adjacent blocks that are already encoded/decoded.

Herein, motion vector information of temporally spatially adjacent blocks that are already encoded/decoded may be at least one of a motion vector, a reference video index, an inter-prediction indicator, a POC, and information of a co-located video of a current coding picture (or, slice) level.

Deriving a temporal merge candidate may mean deriving a temporal merge candidate, and adding the derived temporal merge candidate to a merge candidate list when motion information of the derived temporal merge candidate differs with the existing merge candidate list.

A temporal merge candidate may be derived up to maxNumTemporalMergeCand. Herein, maxNumTemporalMergeCand may be a positive integer including 0. In an example, maxNumTemporalMergeCand may be 1. Meanwhile, use of the maxNumTemporalMergeCand does not limit the scope of the present invention. Encoding/decoding apparatuses may use the above information by using a parameter value having the same meaning with maxNumTemporalMergeCand.

Meanwhile, prediction using a temporal merge candidate may be referred as TMVP (temporal motion vector prediction).

Figure 9:
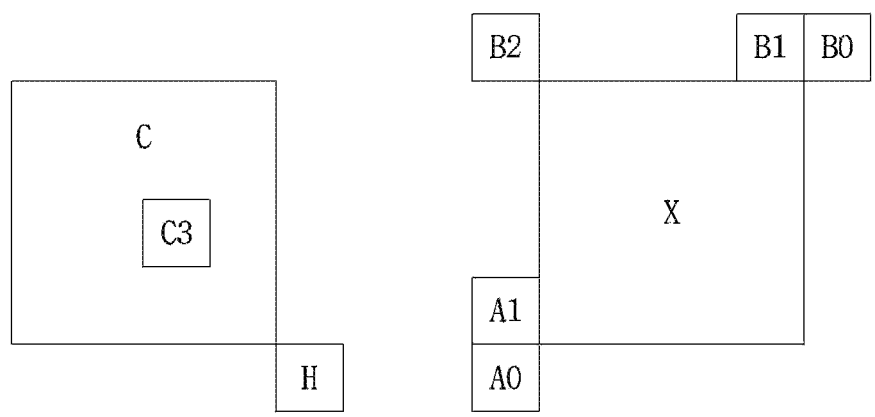
FIG. 9 is a view showing a method of deriving a temporal merge candidate according to an embodiment of the present invention.

FIG. 9 is a view showing a method of deriving a temporal merge candidate according to an embodiment of the present invention.

Referring to FIG. 9, a temporal merge candidate may be derived in a block at a position H that is present at the outside of a co-located block C positioned spatially identical to a current block X to be encoded/decoded within a reference video of a current video to be encoded/decoded, or a block at a position C3.

Herein, when a temporal merge candidate is possibly derived from a block at a position H, the temporal merge candidate may be derived from the block at a position H. Otherwise, when the temporal merge candidate is not derived from the block at a position H, the temporal merge candidate may be derived from the block at a position C3. An order of deriving the temporal merge candidate may vary.

Meanwhile, when a predetermined position or position C3 is intra-encoded, a temporal merge candidate may be derived in a block at the position H or position C3. A co-located block of a current block may have a square form or a non-square form.

When a distance between a video to which a current block is included and a reference video of the current block differs from a distance between a video to which a co-located block is included and a reference video of the co-located block, a temporal merge candidate may be derived by performing scaling for a motion vector of the co-located block. Scaling of a motion vector may be performed according to a ratio of td to tb (in an example, Ratio=(tb/td)). Herein, td may mean a difference value between a POC of a co-located video (co-located picture) and a POC of a reference video of a co-located block. In addition, tb may mean a difference value between a POC of a video to be encoded/decoded and a POC of a reference video of a current block.

Deriving a sub-block based temporal merge candidate will be described.

A temporal merge candidate may be derived from a co-located sub-block to be encoded/decoded in a sub-block unit having at least one of a size, a form, and a depth smaller than a current block. For example, the sub-block may be a block having a horizontal or vertical length smaller than a current block, or a block having deeper depth or minimized form than the current block, or may be a block included in the current block.

A co-located sub-block of a sub-block to be encoded/decoded may have a square form or a non-square form. In addition, a co-located block of a current block may be divided by a sub-block unit having at least one of a size, a form, and a depth smaller or deeper than the current block. At least one temporal merge candidate may be derived for each sub-block.

When deriving at least one temporal merge candidate by performing division in a sub-block unit, a temporal merge candidate may be derived in a co-located sub-block at a position H or C3 or both described with FIG. 9 according to at least one of a size, a form, and a depth of the sub-block. Alternatively, by using motion information (in an example, at least one of a motion vector, reference video index, an inter-prediction indicator, and a POC) stored in each sub-block unit of a co-located block in association with a position moved by arbitrary motion information derived from neighbor blocks of a current block, at least one temporal merge candidate may be derived.

When deriving a temporal merge candidate of a current block or a sub-block of the current block, a motion vector of each reference video list (in an example, L0 or L1 or both) obtained from a co-located sub-block within a co-located block may be scaled as a motion vector in association with an arbitrary reference video of the current block. Alternatively, a plurality of motion vectors may be obtained by performing scaling as a motion vector in association with at least one reference video among all reference videos that are referenced by a sub-block of a current block obtained from a co-located sub-block, and then at least one prediction block using a motion vector scaled in association with each reference video may be obtained. In addition, a prediction block of a current block or sub-block may be obtained by using a weighted sum of obtained prediction blocks.

Meanwhile, prediction using a sub-block based temporal merge candidate may be referred as ATMVP (alternative temporal motion vector prediction).

A method of deriving a sub-block based temporal spatial combined merge candidate will be described.

A merge candidate of a current block may be derived by dividing the current block into sub-blocks and by using at least one piece of motion information of a spatially adjacent sub-block and a co-located sub-block within a co-located video for each sub-block unit which is obtained.

Figure 10:
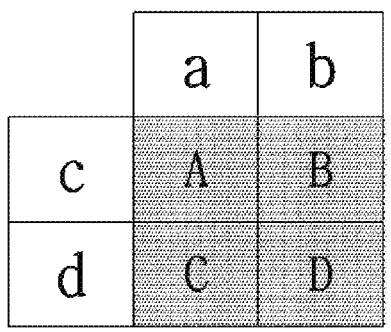
FIG. 10 is a view showing a method of deriving a sub-block based temporal spatial combined merge candidate according to an embodiment of the present invention.

FIG. 10 is a view showing a method of deriving a sub-block based temporal spatial combined merge candidate according to an embodiment of the present invention.

FIG. 10 is a view showing a block structure where a shadow represented by 8×8 current blocks is divided into four 4×4 sub-blocks (that is, A, B, C, and D blocks). A sub-block based temporal spatial combined merge candidate may be derived by using motion vector information of sub-blocks that are temporally spatially adjacent to each sub-block. Herein, motion vector information may mean a motion vector, an inter-prediction indicator, a reference video index, a POC, etc.

In FIG. 10, when deriving a residual signal according to motion compensation after dividing a current block into sub-blocks, motion information may be obtained by performing scanning that starts at a sub-block a that is the upper part of a first sub-block A from the left to the right direction. In an example, when a first upper sub-block is encoded by using an intra-prediction method, a second upper sub-block may be sequentially scanned. In other words, scanning for upper sub-blocks may be performed until an upper sub-block including usable motion vector information is found.

In addition, after obtaining usable motion information for an upper sub-block, usable motion information may be obtained by performing scanning at a sub-block c that is the left of a first sub-block A from the upper to the lower direction.

In addition, after obtaining spatially adjacent motion information of a left or upper sub-block or both, temporal motion information may be derived by obtaining motion information of a co-located sub-block of a current sub-block or a co-located block or both.

Herein, a position of a co-located block or a sub-block of the co-located block may be motion information at a position C3 or position H described with FIG. 9, or may mean a co-located block at a position compensated by a motion vector derived adjacent to a current block or a sub-block of the co-located block. At least one of motion information of a block spatially adjacent to L0 or L1 or both and motion information of a temporally adjacent block may be obtained by using the above method. In addition, based on the at least one piece of obtained motion information, a sub-block based temporal spatial combined merge candidate of a current sub-block to be encoded/decoded may be derived.

In an example, for L0 or L1 or both, scaling of a motion vector in at least one piece of motion vector information derived in the described temporal/spatial sub-block for a sub-block of a current block may be performed so as to be associated with a first reference video of the current block. Subsequently, by using at least one of an average value, a maximum value, a minimum value, a median value, a weighted value, and a mode of up to three scaled motion vectors, a motion vector of a first current sub-block A or a temporal spatial combined merge candidate of the first sub-block A may be derived. In addition, a temporal spatial combined merge candidate of sub-blocks B, C, and D may be derived by using the above method.

Meanwhile, prediction using a sub-block based temporal spatial combined merge candidate may be referred as STMVP (spatial-temporal motion vector prediction).

Deriving an additional merge candidate will be described.

As an additional merge candidate that may be used in the present invention, at least one of a modified spatial merge candidate, a modified temporal merge candidate, a combined merge candidate, and a merge candidate having a predetermined motion information value may be derived.

Herein, deriving an additional merge candidate may mean, when a merge candidate having motion information different to a merge candidate present in an existing merge candidate list is present, adding the corresponding merge candidate to the merge candidate list.

The modified spatial merge candidate may mean a merge candidate in which motion information of at least one of spatial merge candidate derived by using the above method is modified.

The modified temporal merge candidate may mean a merge candidate in which motion information of at least one temporal merge candidate derived by using the above method is modified.

The combined merge candidate may mean a merge candidate using at least one piece of motion information of merge candidates that are a spatial merge candidate, a temporal merge candidate, a modified spatial merge candidate, a modified temporal merge candidate, a combined merge candidate, and a merge candidate having a predetermined motion information value which are present in a merge candidate list. Herein, a combined merge candidate may mean a combined bi-prediction merge candidate. Meanwhile, prediction using a combined merge candidate may be referred as CMP (combined motion prediction).

The merge candidate having a predetermined motion information value may mean a zero merge candidate having a motion vector of (0, 0). Meanwhile, prediction using a merge candidate having a predetermined motion information value may be referred as ZMP (zero motion prediction).

At least one of the modified spatial merge candidate, the spatial merge candidate, the modified temporal merge candidate, the temporal merge candidate, the combined merge candidate, the merge candidate having a predetermined motion information value may be derived for each sub-block of a current block, and the merge candidate derived for each sub-block may be added to the merge candidate list.

Inter-prediction information may be derived in a sub-block unit having at least one of a size, a form, and a depth smaller or deeper than a current block to be encoded/decoded. In an example, the size may mean a horizontal or vertical size or both.

When deriving inter-prediction information in a sub-block unit of a current block, the encoder/decoder may derive inter-prediction information by using at least one of a bilateral matching method, and a template matching method.

When using a bilateral matching method, an initial motion vector list may be configured. When configuring an initial motion vector list, a motion vector adjacent to a current block may be used.

In an example, an initial motion vector list may be configured by using a prediction motion vector candidate of an AMVP mode of a current block.

In another example, an initial motion vector list may be configured by using a merge candidate of a merge mode of a current block.

In another example, an initial motion vector list may be configured with a uni-directional motion vector of L0 or L1 of a merge mode or both of a current block.

In another example, an initial motion vector list may be configured with a motion vector of remaining blocks other than a merge mode of a current block.

In another example, an initial motion vector list may be configured by combining at least N motion vectors of the above examples. Herein, N may represent a positive integer greater than 0.

In another example, an initial motion vector list may be configured with a motion vector of one direction of List0 or List1.

Figure 11:
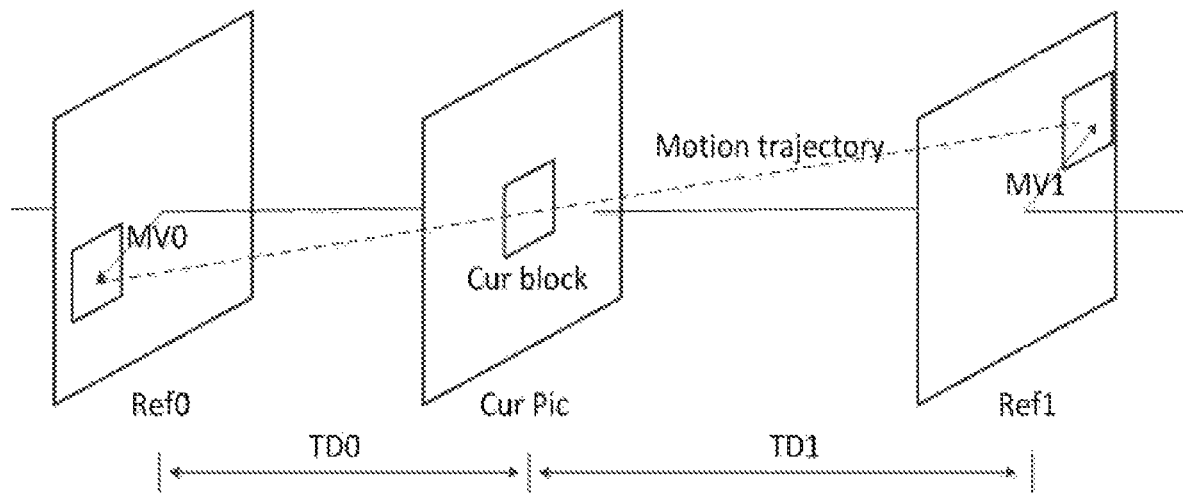
FIG. 11 is a view showing a method of deriving inter-prediction information by using a bilateral matching according to an embodiment of the present invention.

FIG. 11 is a view showing a method of deriving inter-prediction information by using a bilateral matching method according to an embodiment of the present invention.

Referring to FIG. 11, when a motion vector present in an initial motion vector list is an MV0 present in a L0 list, in a reference picture in the opposite direction, an MV1 may be derived that is present on the same trajectory with the MV0 and that indicates a block that matches best with a block indicated by the MV0. Herein, an MV having the smallest SAD (sum of absolute differences) between blocks indicated by the MV0 and the MV1 may be derived as inter-prediction information of a current sub-block.

Figure 12:
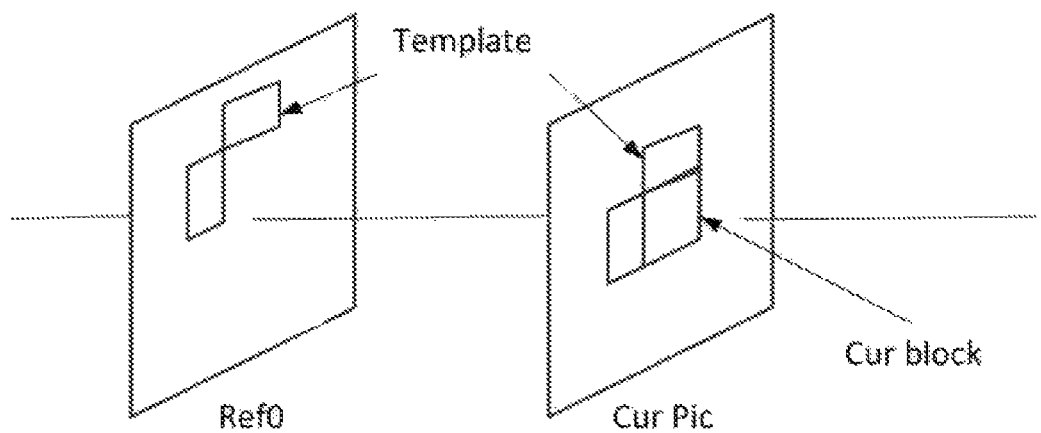
FIG. 12 is a view showing a method of deriving inter-prediction information by using a template matching method according to an embodiment of the present invention.

FIG. 12 is a view showing a method of deriving inter-prediction information by using a template matching method according to an embodiment of the present invention.

By using a template defined in FIG. 12, a neighbor block of a current block may be used as a template. Herein, horizontal (width) and vertical (height) sizes of a template may be the same with or differ from horizontal (width) and vertical (height) sizes of a current block.

In an example, an upper part of a current block (Cur block) may be used as a template.

In another example, a left part of a current block may be used as a template.

In another example, a left part and an upper part of a current block may be used as a template.

In another example, in a reference video (Ref0) of a current video (Cur Pic), an upper part or a left part or both of a co-located block of a current block may be used as a template.

In another example, an MV having the smallest SAD between a template of a current block and a template of a reference block may be derived as inter-prediction information of a current sub-block.

When deriving inter-prediction information in a sub-block unit of a current block, brightness compensation may be performed. For example, change in brightness of a spatial neighbor sample of a current block which is sampled in at least N samples, N being an arbitrary positive integer, and of a spatial neighbor sample of a reference block may be approximated by using linear model. In addition, the linear model may be applied to a block for which motion compensation of a current sub-block is applied so as to perform brightness compensation.

When deriving inter-prediction information in a sub-block unit of a current block, affine based spatial motion prediction and compensation may be performed. For example, for a motion vector of left upper coordinates of a current block and a motion vector at a right upper of the current block, a motion vector may be generated by using an affine transform formula in a sub-block unit of the current block. In addition, motion compensation may be performed by using the generated motion vector.

Figure 13:
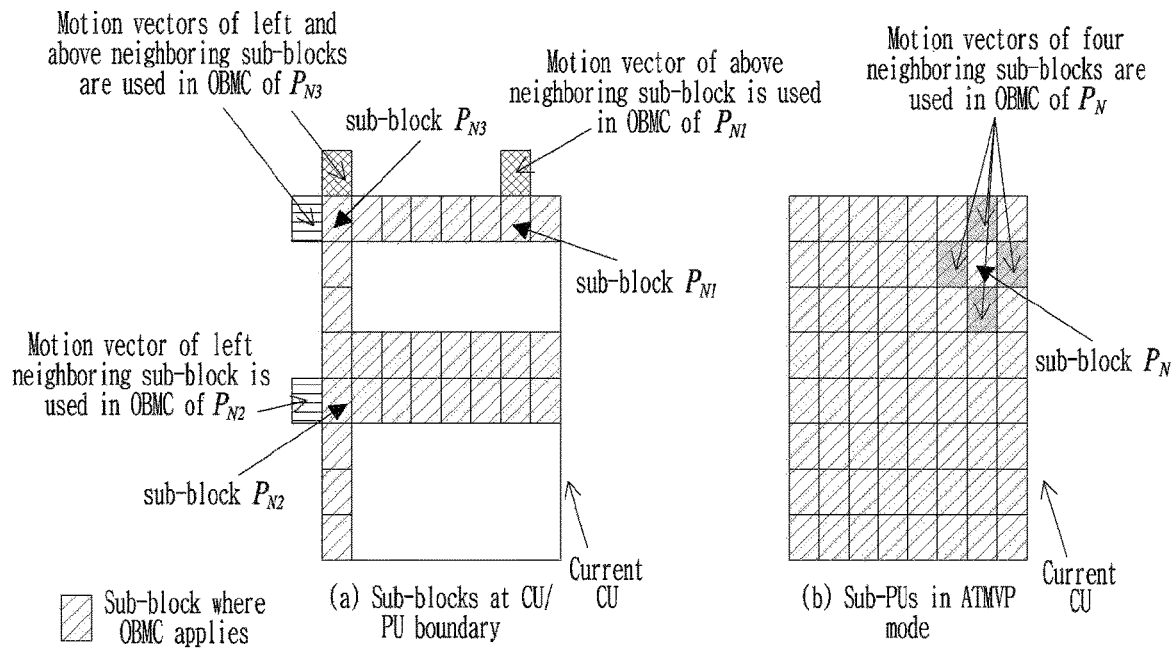
FIG. 13 is a view showing a method of deriving inter-prediction information on the basis of OMBC (overlapped block motion compensation) according to an embodiment of the present invention.

FIG. 13 is a view showing a method of deriving inter-prediction information on the basis of OMBC (overlapped block motion compensation) according to an embodiment of the present invention.

When deriving inter-prediction information in sub-block unit of a current block, combining a block compensated by using inter-prediction information of a current block with at least one sub-block compensated by using inter-prediction information of at least one of sub-blocks at left, right, upper, and lower positions which are included in the current block, a prediction block of the sub-block of the current block based on OBMC may be generated.

In an example, performing may be applied for only a sub-block present at a boundary position of inside of a current block.

In another example, performing may be applied for all sub-blocks inside of a current block.

In another example, performing may be applied for a sub-block present at a left boundary position of inside of a current block.

In another example, performing may be applied for a sub-block present at a right boundary position of inside of a current block.

According to an embodiment of the present invention, a video may be encoded/decoded by dividing the same by a number of sub-block units. A unit and a block may be used having the same meaning.

Figure 14:
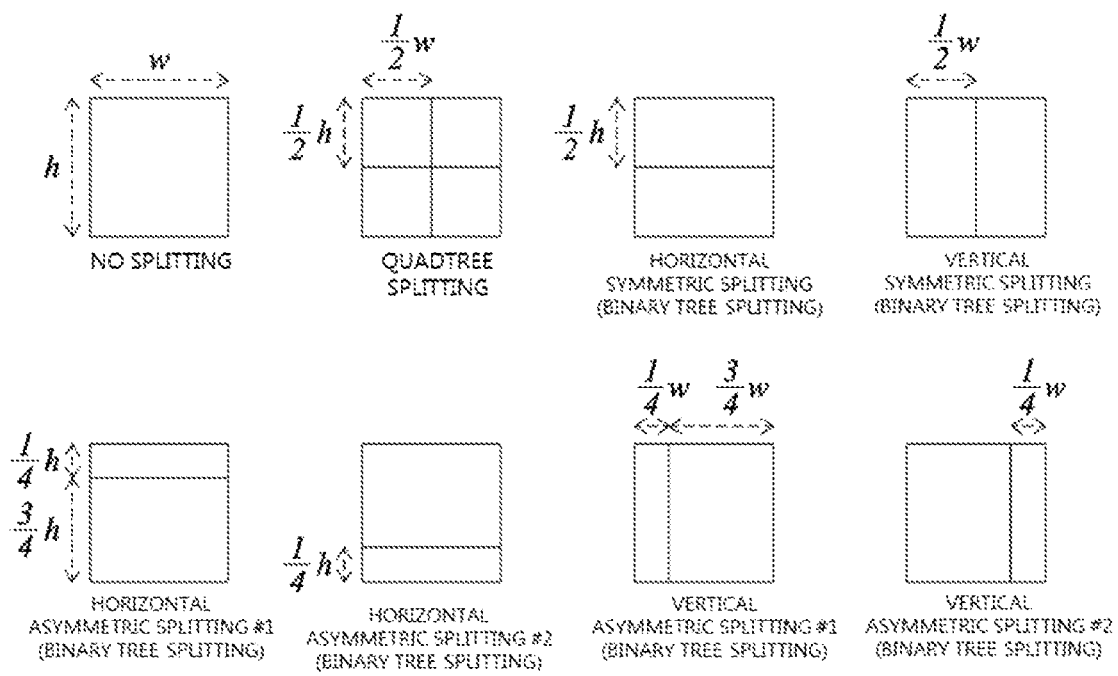
FIG. 14 is a view showing quad-tree division, symmetric binary-tree division, and asymmetric binary division according to an embodiment of the present invention.

FIG. 14 is a view showing quad-tree division, symmetric binary-tree division, and asymmetric binary division according to an embodiment of the present invention. In FIG. 14, w may represent a horizontal size of a block, and h may represent a vertical size of the block.

Referring to FIG. 14, quad-tree division is a division form where one block is divided into four sub-blocks, horizontal and vertical sizes of the four sub-blocks may be a half of horizontal and vertical sizes of a block before being divided.

Binary-tree division is a division form where one block is divided into two sub-blocks, and symmetric binary-tree division (symmetric splitting) or asymmetric binary-tree division (asymmetric splitting) may be included. Herein, symmetric binary-tree division may include horizontal directional symmetric division and vertical directional symmetric division. In addition, asymmetric binary-tree division may include horizontal directional asymmetric division or vertical directional asymmetric division or both. Meanwhile, a leaf node of a binary-tree may mean a CU.

Nodes divided by a symmetric binary-tree may have identical sizes. Meanwhile, nodes divided by an asymmetric binary-tree may have different sizes.

According to an embodiment of the present invention, as a division structure, quad-tree (QT) division may be present.

Referring to FIG. 14, one CTU may be recursively divided into a plurality of CUs by using a quad-tree structure. Whether to use intra-prediction or inter-prediction may be determined on the basis of a CU unit.

In an example, one CU may be divided into at least M PUs. Herein, M may be a positive integer equal to or greater than 2.

In another example, one CU may be divided into at least N TUs by using a quad-tree structure. Herein, N may be a positive integer equal to or greater than 2.

According to an embodiment of the present invention, as a division structure, a binary-tree after quad-tree division may be present. Binary-tree after quad-tree division may mean a division structure where quad-tree division is preferentially applied and then binary-tree division is applied. Herein, a leaf node of a quad-tree or a leaf node of a binary-tree may mean a CU.

In an example, one CTU may be recursively divided into two or four CUs by using binary-tree after quad-tree division. Herein, when a CU is divided into two, division may be performed by using a binary-tree (BT) structure, and when a CU is divided into four, division may be performed by using a quad-tree structure. A CU may have a square form or a non-square (rectangle) form since a CTU is divided by a quad-tree and then a binary-tree.

When a CU is divided by using binary-tree after quad-tree division, at least one of a first flag (information indicating whether or not quad-tree division is performed or whether or not further division is performed or both) and a first index (information indicating of whether horizontal symmetric division or vertical symmetric is performed, or whether or not further division is performed or both) may be signaled. Herein, when the first flag indicates a first value, it may indicate that division is performed by using a quad-tree structure, and when the first flag indicates a second value, it may indicate that further division is not performed. In addition, when the first index indicates a first value, it may indicate that further division is not performed, when the first index indicates a second value, it may indicate horizontal directional symmetric division, and when the first index indicates a third value, it may indicate vertical directional symmetric division. A first index may be signaled when a first flag indicates a second value. In addition, when a CU is determined that further division for the same is not possible on the basis of a size or depth of the CU or both, a first flag or a first index or both may not be signaled.

Figure 15:
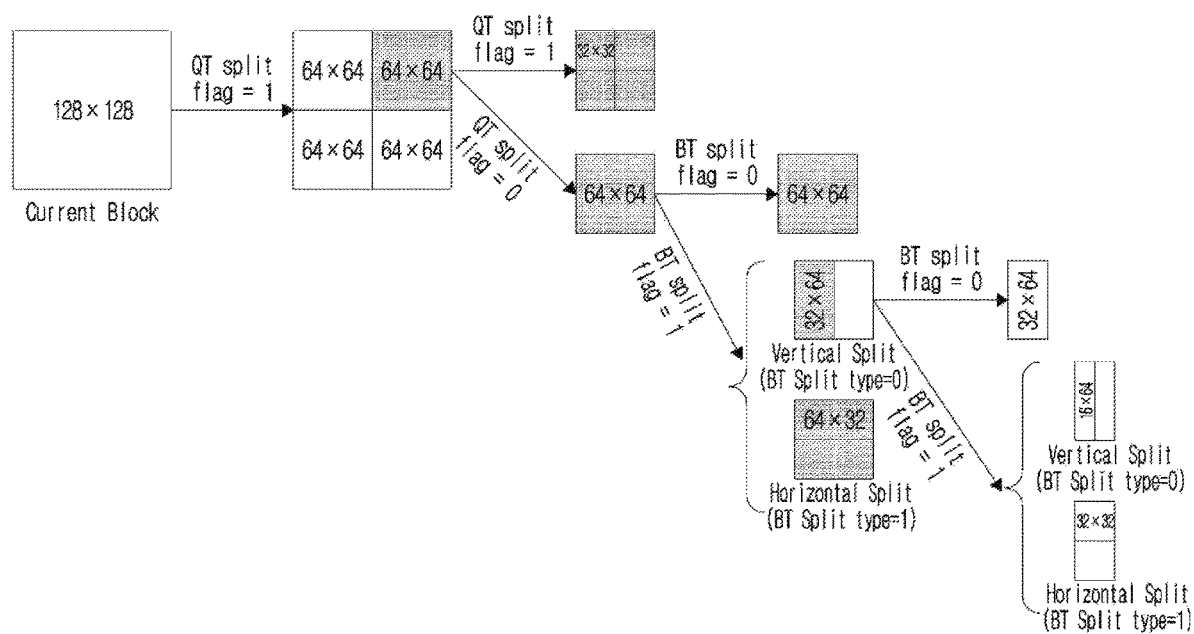
FIG. 15 is a view showing symmetric binary-tree division after quad-tree division according to an embodiment of the present invention.

FIG. 15 is a view showing symmetric binary-tree division after quad-tree division according to an embodiment of the present invention. In FIG. 15, QT split flag may indicate whether or not quad-tree division is performed, BT split flag may indicate whether or not binary-tree division is performed, and BT split type may indicate whether horizontal division (or horizontal directional division) or vertical division (or vertical directional division) is performed.

Referring to FIG. 15, one CTU may be divided by using a quad-tree structure. In addition, a leaf node of a quad-tree may be additionally divided by using a binary-tree structure. Herein, a leaf node of a quad-tree or a leaf node of a binary-tree may mean a CU.

In a binary-tree after quad-tree division structure, a CU may be used as a unit for performing prediction and transform without additionally dividing the same. In other words, in a binary-tree after quad-tree division structure, a CU, a PU, and a TU may have the same size. In addition, whether to use intra-prediction or inter-prediction may be determined in a CU unit. In other words, in a binary-tree after quad-tree division structure, at least one of intra-prediction, inter-prediction, transform, inverse-transform, quantization, dequantization, entropy encoding/decoding, and in-loop filtering may be performed in a square block or non-square (rectangle) block unit.

A CU may include one luma (Y) component block and two chroma (Cb/Cr) component blocks. In addition, a CU may include one luma component block, or two chroma component blocks. In addition, a CU may include one luma component, a Cr chroma component block, or a Cb chroma component block.

According to an embodiment of the present invention, a quad-tree after binary-tree division may be present as a division structure.

According to an embodiment of the present invention, combined quad-tree and binary-tree division may be present as a division structure. Combined quad-tree and binary-tree division may mean a division structure where quad-tree division and binary-tree division are applied without priority. In binary-tree after quad-tree division described above, quad-tree division is preferentially applied.

However, in combined quad-tree and binary-tree division, quad-tree division is not precedent and binary-tree division may be applied first.

One CTU may be recursively divided into two or four CUs by using a combined quad-tree and binary-tree division structure. In a combined quad-tree and binary-tree division structure, quad-tree division or binary-tree division may be applied for one CU. Herein, when a CU is divided into two, division may be performed by using a binary-tree, and when a CU is divided into four, division may be performed by using a quad-tree. In addition, since a CU is obtained by dividing a CTU by using a combined quad-tree and binary-tree structure, the CU may have a square or non-square (rectangle) form.

By using a block division structure of a combined quad-tree and binary-tree form, a video may be encoded/decoded in all non-square block forms having predetermined horizontal and vertical sizes or greater.

A luma signal and a chroma signal within a CTU may be divided by block division structures different from each other. For example, in case of a specific slice (I slice), a luma signal and a chroma signal within a CTU may be divided by block division structures different from each other. In case of other slice (P or B slice), a luma signal and a chroma signal within a CTU may be divided by an identical block division structure. Herein, a Cb signal and a Cr signal may use a different intra-prediction mode, and an intra-prediction mode of each of the Cb signal and the Cr signal may be entropy encoded/decoded. An intra-prediction mode of a Cb signal may be entropy encoded/decoded by using an intra-prediction mode of a Cr signal. Conversely, an intra-prediction mode of a Cr signal may be entropy encoded/decoded by using an intra-prediction mode of a Cb signal.

A method of deriving intra-prediction or inter-prediction information or both based on a sub-block will be described.

Hereinafter, a sub-block division method will be described.

A current block (CU) may have a square or rectangle form or both, and may mean a leaf node of at least one of a quad-tree, a binary-tree, and a three-division tree. In addition, at least one of intra-prediction or inter-prediction or both, primary/secondary transform and inverse-transform, quantization, dequantization, entropy encoding/decoding, and in-loop filtering encoding/decoding may be performed according to at least one of a size, a form, and a depth of a current block (CU).

A current block may be divided into at least one of a symmetric or asymmetric sub-block or both. Intra-prediction or inter-prediction information or both may be derived for each sub-block. Herein, a symmetric sub-block may mean a sub-block obtained by using at least one of quad-tree, binary-tree, and three-division tree division structures described with FIG. 14. Meanwhile, an asymmetric sub-block may mean a sub-block obtained by using a division structure that will be described with FIG. 16, but it is not limited thereto. An asymmetric sub-block may mean at least one sub-block having a form other than a square or rectangle form or both among sub-blocks.

Figure 16:
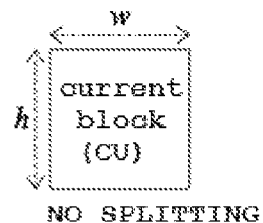
FIG. 16 is a view showing asymmetric division according to an embodiment of the present invention.
Figure 16:
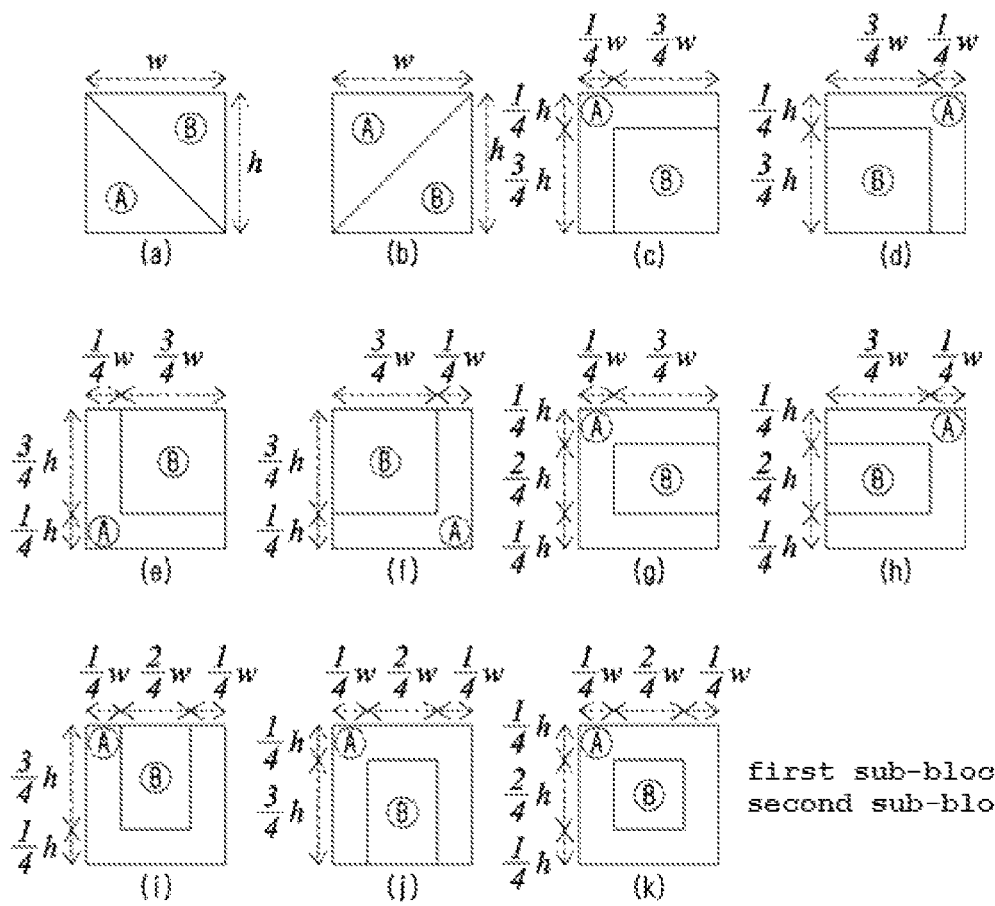

In FIG. 16, when a current block is divided into two sub-blocks, the two sub-blocks may be defined as a first sub-block, and a second sub-block, respectively. Meanwhile, the first sub-block may be called a sub-block A, and the second sub-block may be called a sub-block B.

When a current block is divided into at least one of a symmetric or asymmetric sub-block or both, a minimum size of the sub-block may be defined as M×N. Herein, M and N may respectively mean a positive integer greater than 0. In addition, M and N may have the same or different values from each other. In an example, a 4×4 block may be defined as a minimum-size sub-block.

When a current block is divided into at least one of a symmetric or asymmetric sub-block or both, block division may not be further performed for a specific block size or specific block depth or smaller/deeper. Information of the specific block size or specific block depth may be entropy encoded/decoded in a unit of at least one of a vide parameter set (VPS), a sequence parameter set (SPS), a picture parameter set (PPS), a tile header, a slice header, a CTU, and a CU.

Information of the specific block size or specific block depth may be entropy encoded/decoded for each of luma and chroma signals, and may have parameter values different from each other.

Information of the specific block size or specific block depth may be entropy encoded/decoded for each of Cb and Cr signals, and may have different parameter values.

Information of the specific block size of specific block depth may be entropy encoded/decoded for each upper level, and may have different parameter values.

Information of the specific block size or specific block depth may be determined on the basis of comparison between a size of a current block or a depth of the current block and a predetermined threshold value. A predetermined threshold value may mean a reference size or depth determining a block structure. In addition, a predetermined threshold value may be represented in a form of at least one of a minimum value and a maximum value of the reference size or depth. In addition, a predetermined threshold value may be a value predefined in the encoder/decoder, may be variably derived on a basis of a coding parameter of a current block, or may be signaled through a bitstream.

In an example, when a size or depth of a current block is equal to or smaller or equal to or greater or both than a predetermined threshold, dividing the current block into at least one sub-block may not be performed. For example, when the sum of horizontal and vertical lengths of a current block is equal to or smaller than a predetermined threshold value, dividing the current block into at least one sub-block may not be performed.

In another example, when a size or depth of a current block is smaller or greater or both than a predetermined threshold value, dividing the current block into at least one sub-block may not be performed. For example, when the sum of horizontal and vertical lengths of a current block is smaller than a predetermined threshold value, dividing the current block into at least one sub-block may not be performed.

In another example, when a current block is a quad-tree leaf node having a depth of a predetermined threshold value, dividing the current block into at least one sub-block may not be performed.

In another example, when a current block is a binary-tree leaf node having a depth of a predetermined threshold value, dividing the current block into at least one sub-block may not be performed.

In another example, when a current block is a leaf node of at least one of a quad-tree, a binary-tree, and a three-division tree performing motion prediction/compensation by using an affine transform formula, dividing the current block into at least one sub-block or dividing the current block into an asymmetric sub-block may not be performed.

In another example, when a current block is a leaf node of at least one of a quad-tree, a binary-tree, and a three-division tree, deriving inter-prediction information by using at least one of a bilateral matching method and a template matching method, dividing the current block into at least one sub-block or dividing the current block into an asymmetric sub-block may not be performed.

When a current block is divided into at least one asymmetric sub-block, at least one of sub-blocks may have an arbitrary form other than square or rectangle.

According to the present invention, when a current block is divided into at least one asymmetric sub-block, at least one of sub-blocks may have a triangle block form.

FIG. 16 is a view showing asymmetric division according to an embodiment of the present invention. In FIG. 16, w may represent a horizontal size of a block, and h may represent a vertical size of the block.

In (a) of FIG. 16, when a current block is divided into two sub-blocks, the current block may be divided into two sub-blocks of a triangle form obtained by dividing the current block by a diagonal boundary from the left-upper to right-lower. Herein, remaining areas other than a right-upper area of the current block (second sub-block or sub-block B) may be defined as a first sub-block or sub-block A.

In (b) of FIG. 16, when a current block is divided into two sub-blocks, the current block may be divided into two sub-blocks of a triangle form obtained by dividing the current block by a diagonal boundary from the right-upper to left-lower. Herein, remaining areas other than a right-lower area of the current block (second sub-block or sub-block B) may be defined as a first sub-block or sub-block A.

Referring to (a) of FIG. 16 and (b) of FIG. 16, when a current block is divided into four sub-blocks, the current block may be divided into four triangle-form sub-blocks that are obtained by dividing the current block by a diagonal boundary from left-upper to right-lower and by a diagonal boundary from right-upper to left-lower. Alternatively, a current block may be divided into four triangle-form sub-blocks that are obtained by dividing the current block by a diagonal boundary from right-upper to left-lower and by a diagonal boundary from left-upper to right-lower.

Meanwhile, dividing into a triangle-form sub-block may be applied to a case where a motion prediction/compensation method of a current block (CU) is at least one of a skip mode and a merge mode.

In (c) of FIG. 16, when a current block is divided into two sub-blocks, remaining areas other than a right-lower area of the current block (second sub-block or sub-block B) may be defined as a first sub-block or sub-block A.

In (d) of FIG. 16, when a current block is divided into two sub-blocks, remaining areas other than a left-lower area of the current block (second sub-block or sub-block B) may be defined as a first sub-block or sub-block A.

In (e) of FIG. 16, when a current block is divided into two sub-blocks, remaining areas other than a right-upper area of the current block (second sub-block or sub-block B) may be defined as a first sub-block or sub-block A.

In (f) of FIG. 16, when a current block is divided into two sub-blocks, remaining areas other than a left-upper area of the current block (second sub-block or sub-block B) may be defined as a first sub-block or sub-block A.

In (g) of FIG. 16, when a current block is divided into two sub-blocks, an area of a 1" form configured with a partial upper part, a partial lower part, and a partial left part of the current block may be defined as a first sub-block or sub-block A. In addition, remaining areas other than the first sub-block or sub-block A may be defined as a second sub-block or sub-block B.

In (h) of FIG. 16, when a current block is divided into two sub-blocks, an area of a 1" form configured with a partial upper part, a partial lower part, and a partial right part of the current block may be defined as a first sub-block or sub-block A. In addition, remaining areas other than the first sub-block or sub-block A may be defined as a second sub-block or sub-block B.

In (i) of FIG. 16, when a current block is divided into two sub-blocks, an area of a "reversed- ⊓ " form configured with a partial lower part, a partial right part, and a partial left part of the current block may be defined as a first sub-block or sub-block A. In addition, remaining areas other than the first sub-block or sub-block A may be defined as a second sub-block or sub-block B.

In (j) of FIG. 16, when a current block is divided into two sub-blocks, an area of a " ⊓ " form configured with a partial upper part, a partial right part, and a partial right part of the current block may be defined as a first sub-block or sub-block A. In addition, remaining areas other than the first sub-block or sub-block A may be defined as a second sub-block or sub-block B.

In (k) of FIG. 16, when a current block is divided into two sub-blocks, remaining areas other than a center area of the current block (second sub-block or sub-block B) may be defined as a first sub-block or sub-block A.

Meanwhile, a first sub-block (or sub-block A) and a second sub-block (or sub-block B) defined in (a) of FIG. 16 to (k) of FIG. 16 may be interchanged from each other.

The encoder/decoder may store a table or list including a plurality of asymmetric division forms. An asymmetric division form of a current block determined in the encoder may be transmitted to the decoder in an index or flag form. Meanwhile, the encoder/decoder may determine an asymmetric division form of a current block on the basis of a coding parameter of the current block. In addition, the encoder/decoder may determine an asymmetric division form of a current block from a neighbor block of the current block.

When a current block is divided into at least one asymmetric sub-block, the sub-block may have a size in which a horizontal or vertical size or both are equal to or smaller than a horizontal (h) or vertical (v) size or both of the current block.

In FIG. 16, when a current block is divided into two sub-blocks, the sub-block may have a horizontal or vertical size or both being smaller than the current block.

In (c) of FIG. 16 to (f) of FIG. 16, when a current block is divided into two sub-blocks, a second sub-block may have a size in which horizontal and vertical sizes are (¾)×w and (¾)×h over horizontal (w) and vertical (h) sizes of the current block.

In (g) of FIG. 16 to (h) of FIG. 16, when a current block is divided into two sub-blocks, a second sub-block may have a size in which horizontal and vertical sizes are (¾)×w and (²⁄₄)×h over horizontal (w) and vertical (h) sizes of the current block.

In (i) of FIG. 16 to (j) of FIG. 16, when a current block is divided into two sub-blocks, a second sub-block may have a size in which horizontal and vertical sizes are (²⁄₄)×w and (¾)×h over horizontal (w) and vertical (h) sizes of the current block.

In (k) of FIG. 16, a second sub-block may have a size in which horizontal and vertical sizes are (²⁄₄)×w and (²⁄₄)×h over horizontal (w) and vertical (h) sizes of the current block.

Meanwhile, a ratio of a horizontal size to a vertical size of a second sub-block describe above may be set to a ratio predefined in the encoder and the decoder, or may be obtained on the basis of information signaled from the encoder to the decoder.

A current block (CU) may have a square or rectangle form or both. In addition, a current block may be divided into at least one asymmetric sub-block by using the above described method, so that intra-prediction or inter-prediction information or both may be derived. Herein, intra-prediction or inter-prediction information or both may be derived for each sub-block in a unit of a lowest level sub-block unit, and the lowest level sub-block may mean the smallest block unit having a predetermined size. For example, a block size of 4×4 blocks may be defined as the lowest level sub-block.

In addition, size information of a lowest level sub-block may be entropy encoded/decoded in a unit of at least one of a VPS, an SPS, a PPS, a tile header, a slice header, a CTU, and a CU.

A current block (CU) may mean a leaf node of at least one of a quad-tree, a binary-tree, and a three division tree, and at least one of intra-prediction or inter-prediction or both, primary/secondary transform and inverse-transform, quantization, dequantization, entropy encoding/decoding, and in-loop filtering encoding/decoding may be performed according to at least one of a size, a form, and a depth of a sub-block.

A current block (CU) may mean a leaf node of at least one of a quad-tree, a binary-tree, and a three division tree, at least one encoding/decoding of intra/inter-prediction, primary/secondary transform and inverse-transform, quantization, dequantization, entropy encode/decode, and in-loop filtering encoding/decoding which are performed for encoding/decoding the current block may be performed according to at least one of a size, a form, and a depth of a sub-block.

In an example, when encoding a current block (CU), intra/inter-prediction may be performed according to at least one of a size, a form, and a depth of a sub-block. Primary/secondary transform and inverse-transform, quantization, dequantization, entropy encoding/decoding and in-loop filtering, other than intra/inter-prediction, may be performed according to at least one of a size, a form, and a depth of the current block.

In another example, when a current block is divided into two sub-blocks (for example, first sub-block and second sub-block), different intra-prediction information may be derived from the first sub-block and the second sub-block.

In another example, when a current block is divided into two sub-blocks (for example, first sub-block and second sub-block), different inter-prediction information may be derived from the first sub-block and the second sub-block.

In another example, when a current block is divided into two sub-blocks (for example, first sub-block and second sub-block), combined intra-prediction or inter-prediction information or both may be derived from the first sub-block and the second sub-block. Herein, inter-prediction information may be derived from the first sub-block, and intra-prediction information may be derived from the second sub-block. Alternatively, intra-prediction information may be derived from the first sub-block, and inter-prediction information may be derived from the second sub-block.

In another example, when encoding a current block (CU), primary/secondary transform and inverse-transform may be performed according to at least one of a size, a form, and a depth of a sub-block. Intra-prediction or inter-prediction or both, quantization, dequantization, entropy encoding/decoding, and in-loop filtering, other than primary/secondary transform and inverse-transform, may be performed according to at least one of a size, a form, and a depth of the current block.

In another example, when a current block is divided into two sub-blocks (for example, first sub-block and second sub-block), primary/secondary transform and inverse-transform may be omitted for the first sub-block or second sub-block or both, or different primary/secondary transform and different inverse-transform may be performed for the first sub-block or second sub-block or both.

In another example, when a current block is divided into two sub-blocks (for example, first sub-block and second sub-block), secondary transform and inverse-transform may be omitted for the first sub-block or second sub-block or both, or different primary/secondary transform and different inverse-transform may be performed for the first sub-block or second sub-block or both.

In another example, when encoding a current block (CU), quantization and dequantization may be performed according to at least one of a size, a form, and a depth of a sub-block. Intra-prediction or inter-prediction or both, primary/secondary transform and inverse-transform, entropy encoding/decoding, and in-loop filtering, other than quantization and dequantization, may be performed according to at least one of a size, a form, and a depth of the current block.

In another example, when a current block is divided into two sub-blocks (for example, first sub-block and second sub-block), quantization and dequantization may be omitted for the first sub-block or second sub-block or both, or different quantization and different dequantization may be performed for the first sub-block or second sub-block or both In another example, when a current block is divided into two sub-blocks (for example, first sub-block and second sub-block), the first sub-block may be quantized according to a quantization parameter set when encoding is performed at first, and the second sub-block may be encoded/decoded by using a quantization parameter differing from the quantization parameter set at first. Herein, a quantization parameter or an offset or both of a second sub-block using a quantization parameter different from the quantization parameter set at first may be explicitly transmitted, or may be implicitly derived according to a method set in the encoder/decoder.

In another example, when a current block is divided into two sub-blocks (for example, first sub-block and second sub-block), the second sub-block may be quantized according to a quantization parameter set when encoding is performed at first, and the first sub-block may be encoded/decoded by using a quantization parameter differing from the quantization parameter set at first. Herein, a quantization parameter or an offset or both of a first sub-block using a quantization parameter different from the quantization parameter set at first may be explicitly transmitted, or may be implicitly derived according to a method set in the encoder/decoder.

In another example, when encoding a current block (CU), entropy encoding/decoding may be performed according to at least one of a size, a form, and a depth of a sub-block. Intra-prediction or inter-prediction or both, primary/secondary transform and inverse-transform, quantization and dequantization, and in-loop filtering, other than entropy encoding/decoding, may be performed according to at least one of a size, a form, and a depth of the current block.

In another example, when encoding a current block (CU), in-loop filtering may be performed according to at least one of a size, a form, and a depth of a sub-block. Intra-prediction or inter-prediction or both, primary/secondary transform and inverse-transform, entropy encoding/decoding, and quantization and dequantization, other than in-loop filtering, may be performed according to at least one of a size, a form, and a depth of the current block.

In another example, when a current block is divided into two sub-blocks (for example, first sub-block and second sub-block), in-loop filtering may be omitted for the first sub-block or second sub-block or both, or different in-loop filtering may be performed for the first sub-block or second sub-block or both.

When a current block is divided into at least one of a symmetric or asymmetric sub-block or both, a flag whether or not division into sub-blocks is performed or index information of a sub-block division type or both may be signaled in a block (CU) unit through a bitstream. Alternatively, the same may be variably derived on the basis of a coding parameter of a current block. Herein, a sub-block division type may be defined by using at least one asymmetric sub-block division type described with (a) of FIG. 16 to (k) of FIG. 16, and then encoding/decoding of a current block may be performed. Alternatively, a sub-block division type may be a block form that is predefined in the encoder/decoder, other than symmetric sub-block division types described with (a) of FIG. 16 to (k) of FIG. 16, and may include at least one arbitrary block form among sub-blocks other than a square or rectangle form or both. Meanwhile, a sub-block division type may include information of at least one of a division direction of a current block so as to being divided into sub-blocks, a sub-block form, a formation relation between the current block and the sub-block, and a formation relation between sub-blocks.

For example, when using at least one type of (a) of FIG. 16 to (k) of FIG. 16, a flag of whether or not encoding and decoding is performed on the basis of a sub-block or a sub-block partitioning index (or sub-block division type) or both may be signaled through a bitstream, or may be variably derived on the basis of a coding parameter of a current block. Herein, when explicitly transmitting index information, at least one of a truncated rice binarization method, a K-th order exp_golomb binarization method, a restricted K-th order exp_golomb) binarization method, a fixed-length binarization method, a unary binarization method, and a truncated unary binarization method may be used. In addition, encoding/decoding may be finally performed for a current block by using CABAC(ae(v)) after performing binarization.

In addition, for example, when using at least two types of (a) of FIG. 16 and (b) of FIG. 16, a flag representing whether or not sub-block division in a triangle form is performed for a current block (CU) may be signaled.

The flag may be signaled in a unit of at least one of a VPS, an SPS, a PPS, a tile header, a slice header, a CTU, and a CU. In addition, the flag may be signed in case of a specific slice (for example, B slice).

In addition, when sub-block division in a triangle form is performed for a current block (CU), an index indicating at least one of direction information which divides the CU into a triangle-form sub-block and motion information of the triangle-form sub-block may be signaled. The index may be variably derived on the basis of a coding parameter of a current block.

Meanwhile, when the flag indicates a first value, it may indicate that motion prediction/compensation based on a triangle-form sub-block may be used for generating a prediction sample of a current block (CU). In addition, meanwhile, the index may be signaled when the flag indicates a first value.

An index range may be from 0 to M. M may be a positive integer greater than 0. For example, M may be 39.

In addition, the encoder/decoder may store a table of list for deriving a division direction through which a current block is divided into an arbitrary sub-block or motion information of the sub-block from the index.

Table 1 is an example of a look-up table showing a direction of dividing a current block into a triangle-form sub-block. A direction of dividing into a triangle-form sub-block may be derived on the basis of the index described above.

TABLE 1

| | merge_triangle_idx [xCb] [yCb] | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| TriangleDir | 0 | 1 | 1 | 0 | 0 | 1 | 1 | 1 | 0 | 0 | 0 | 0 | 1 | 0 | 0 | 0 | 0 | 1 | 1 | 1 |
| | merge_triangle_idx [xCb] [yCb] | | | | | | | | | | | | | | | | | | | |
| | 20 | 21 | 22 | 23 | 24 | 25 | 26 | 27 | 28 | 29 | 30 | 31 | 32 | 33 | 34 | 35 | 36 | 37 | 38 | 39 |
| TriangleDir | 1 | 0 | 0 | 1 | 1 | 1 | 1 | 1 | 1 | 1 | 0 | 0 | 1 | 0 | 1 | 0 | 0 | 1 | 0 | 0 |

Referring to Table 1, when a value of TriangleDir has a first value of 0, it may mean that a current block is divided into two triangle-form sub-blocks by dividing the same by a diagonal boundary from left-upper to right-lower. For example, it may mean a division form of (a) of FIG. 16. In addition, when a value of TriangleDir have a second value of 1, it may mean that a current block is divided into two triangle-form sub-blocks by dividing the same by a diagonal boundary from right-upper to left-lower. For example, it may mean a division form of (b) of FIG. 16. Meanwhile, the first value and the second value may be interchanged from each other.

Meanwhile, an index (merge_triangle_idx) range indicating a direction f the sub-bloc division may be from 0 to 39. The index may be signaled for a current block. The index information may be identical to index information indicating a merge candidate used in each sub-block which will be described in Table 2 later.

Meanwhile, at least one of a flag and an index which is entropy encoded in the encoder and entropy decoded in the decoder may use at least one of binarization methods below.

Truncated rice binarization method
K-th order exp_golomb binarization method
Restricted K-th order exp_golomb binarization method
Fixed-length binarization method
Unary binarization method
Truncated unary binarization method A method of deriving intra/intra-prediction information between sub-blocks will be described.

When a current block is divided into at least one of a symmetric or asymmetric sub-block or both, prediction information of the current block may be derived by using at least one of deriving inter-prediction information different between sub-blocks from each sub-block, deriving intra-prediction information different between sub-blocks from each sub-block, and deriving combined intra/inter-prediction information between sub-blocks.

Inter-prediction information may mean at least one of motion information used for motion prediction/compensation (for example, at least one of a motion vector, an inter-prediction indicator, a reference video index, a POC, a skip flag, a merge flag, an merge index, an affine flag, an OBMC flag, bilateral matching or template matching flag or both, and a BIO (bi-directional optical flow). Meanwhile, inter-prediction information and motion information may be defined as the same meaning.

Intra-prediction information may mean intra-prediction mode information used for generating an intra-prediction block (for example, at least one of an MPM flag, an MPM index, a selected modes set flag, a selected mode index, and a remaining mode index.

Intra-prediction or inter-prediction information or both may be explicitly transmitted through a bitstream from the encoder to the decoder, or may be variably derived on the basis of a current block or at least one of a size, a form, and a depth of a sub-block or both. In addition, intra-prediction or inter-prediction information or both may be variably derived on the basis of a coding parameter of a current block or a sub-block or both, or may be signaled through a bitstream.

A method of deriving inter-prediction information between sub-blocks will be described.

When a current block is divided into at least one of a symmetric or asymmetric sub-block or both, inter-prediction information different between sub-blocks may be derived from each sub-block. Herein, inter-prediction information may be derived by using at least one inter-prediction method of a skip mode for each sub-block, a merge mode, an AMVP mode, motion prediction/compensation using an affine transform formula, bilateral matching, template matching, and motion prediction/compensation based on OBMC.

In FIG. 16, when a current block is divided into two sub-blocks, different inter-prediction information may be derived from a first sub-block (or sub-block A) or a second sub-block (or sub-block B). When deriving inter-prediction information of a first sub-block, motion information may be derived by using at least one inter-prediction method of a skip mode for each sub-block, a merge mode, an AMVP mode, motion prediction/compensation using an affine transform formula, bilateral matching, template matching, and motion prediction/compensation based on OBMC. In addition, when deriving prediction information of a second sub-block, motion information may be derived by using at least one inter-prediction method of a skip mode for each sub-block, a merge mode, an AMVP mode, motion prediction/compensation using an affine transform formula, bilateral matching, template matching, and motion prediction/compensation based on OBMC.

In FIG. 16, when a current block is divided into two sub-blocks, motion information may be derived in a unit of a lowest level sub-block from each sub-block. Herein, the lowest level sub-block may mean the smallest block unit having a predetermined size. For example, a block size of a 4×4 block may be defined as the lowest level sub-block.

In FIG. 16, when a current block is divided into two sub-blocks, skip mode based different motion prediction/compensation may be performed for all sub-blocks according to each sub-block form. Herein, two pieces of different motion information (for example, at least one of a skip flag or merge index information or both, and a POC) of a current block may be explicitly transmitted.

In FIG. 16, when a current block is divided into two sub-blocks, merge mode based different motion prediction/compensation may be performed for all sub-blocks according to each sub-block form. Herein, two different pieces of motion information (for example, at least one of a merge flag or merge index information or both, and a POC) of a current block may be explicitly transmitted.

In (a) of FIG. 16 or (b) of FIG. 16 or both, when a current block is divided into two triangle-form sub-blocks, merge mode-based motion prediction/compensation for a first sub-block or second sub-block or both may be performed on the basis of different motion information. Herein, two pieces of different motion information of a current block may be derived by configuring a merge candidate list on the basis of a different merge candidate of each sub-block. For example, motion information of a current block may be derived by configuring a merge candidate list including a spatial merge candidate, a temporal merge candidate, a combined merge candidate, a zero merge candidate, etc. and by using a different merge candidate of each sub-block. N may mean a natural number value greater than 0. When configuring the merge candidate list, when a corresponding merge candidate includes bi-directional motion information, a merge candidate list configured with uni-directional prediction candidates may be configured so as to reduce a memory bandwidth. For example, for the bi-directional motion information, L0 or L1 motion information may be added to a list, or an average value or weighted sum of L0 and L1 motion information may be added to the list. Meanwhile, when using a different merge candidate for each sub-block, a predefined value may be used.

In an example, when using a different merge candidate for each sub-block, for a first sub-block (or sub-block A), an N-th candidate within a merge candidate list may be used, and for a second sub-block (or sub-block B), an M-th candidate within the merge candidate list may be used. N and M may be a natural number including 0, and N and M may be the same or different from each other. Meanwhile, N and M may be a value predefined in the encoder/decoder.

In another example, when using a different merge candidate for each sub-block, for a merge candidate (or index information of a merge candidate) in association with each sub-block, a merge candidate group (or merge candidate group list or table) may be defined and used. The merge candidate group may include a pair of merge candidates for each sub-block as an element. In addition, when a number of merge candidates configured with a spatial merge candidate, a temporal merge candidate, a combined merge candidate, a zero merge candidate, etc. is N, each merge candidate in association with each sub-block may have a value from 0 to N−1. Herein, N is a natural number larger than 0.

Table 2 shows an example of a look-up table representing a merge candidate used in each sub-block.

TABLE 2

| | merge_triangle_idx [xCb] [yCb] | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| A | 1 | 0 | 0 | 0 | 2 | 0 | 0 | 1 | 3 | 4 | 0 | 1 | 1 | 0 | 0 | 1 | 1 | 1 | 1 | 2 |
| B | 0 | 1 | 2 | 1 | 0 | 3 | 4 | 0 | 0 | 0 | 2 | 2 | 2 | 4 | 3 | 3 | 4 | 4 | 3 | 1 |

| | merge_triangle_idx [xCb] [yCb] | | | | | | | | | | | | | | | | | | | |
|---|---|---|---|---|---|---|---|---|---|---|---|---|---|---|---|---|---|---|---|---|
| | 20 | 21 | 22 | 23 | 24 | 25 | 26 | 27 | 28 | 29 | 30 | 31 | 32 | 33 | 34 | 35 | 36 | 37 | 38 | 39 |
| A | 2 | 2 | 4 | 3 | 3 | 3 | 4 | 3 | 2 | 4 | 4 | 2 | 4 | 3 | 4 | 3 | 2 | 2 | 4 | 3 |
| B | 0 | 1 | 3 | 0 | 2 | 4 | 0 | 1 | 3 | 1 | 1 | 3 | 2 | 2 | 3 | 1 | 4 | 4 | 2 | 4 |

Referring to Table 2, as shown in (a) of FIG. 16 or (b) of FIG. 16, when a current block is divided into two triangle-form sub-blocks, A may mean a first sub-block (or sub-block A), and B may mean a second sub-block (or sub-block B). In addition, when a number of merge candidates configured with a spatial merge candidate, a temporal merge candidate, a combined merge candidate, a zero merge candidate, etc. is five, A and B may respectively have a value from 0 to 4.

Meanwhile, an index (merge_triangle_idx) range indicating index information of a merge candidate mapped to each sub-block may be from 0 to M. M may be a positive integer greater than 0. For example, in Table 2, M may be 39. The index may be signaled for a current block. Accordingly, motion information of a sub-block may be derived on the basis of the index. Meanwhile, the index information may be identical to index information indicating division direction information of a sub-block described in Table 1.

Meanwhile, the encoder/decoder may store a table or list for deriving a division direction through which a current block is divided into an arbitrary sub-block, or motion information of the sub-block from the index.

In FIG. 16, when a current block is divided into two sub-blocks, bilateral matching based motion prediction/compensation may be performed for a first sub-block, and template matching based motion prediction/compensation may be performed for a second sub-block. Herein, motion information of each sub-block (for example, at least one of a motion vector, an inter-prediction indicator, a reference video index, and a POC) may be explicitly transmitted from the encoder, or may be implicitly derived in the encoder/decoder.

In FIG. 16, when a current block is divided into two sub-blocks, template matching based motion prediction/compensation may be performed for a first sub-block, and bilateral matching based motion prediction/compensation may be performed for a second sub-block. Herein, motion information of each sub-block (for example, at least one of a motion vector, an inter-prediction indicator, a reference video index, and a POC) may be explicitly transmitted from the encoder, or may be implicitly derived in the encoder/decoder.

In FIG. 16, when a current block is divided into two sub-blocks, motion prediction/compensation for a first sub-block may be performed by using motion information of a spatially adjacent block, and inter-prediction information of a second sub-block may be derived by using at least one inter-prediction method of a skip mode, a merge mode, an AMVP mode, an affine transform formula, and motion prediction/compensation based on bilateral matching, template matching, and OBMC based motion prediction/compensation.

In FIG. 16, when a current block is divided into two sub-blocks, motion prediction/compensation for a second sub-block may be performed by using motion information of a spatially adjacent block, and inter-prediction information of a first sub-block may be derived by using at least one inter-prediction method of a skip mode, a merge mode, an AMVP mode, an affine transform formula, and motion prediction/compensation based on bilateral matching, template matching, and OBMC based motion prediction/compensation.

Meanwhile, by using motion information of a spatially adjacent block, motion information of a first sub-block or second sub-block or both for which motion prediction/compensation is performed may be derived in a unit of a lowest level sub-block having a predetermined size.

Figure 17:
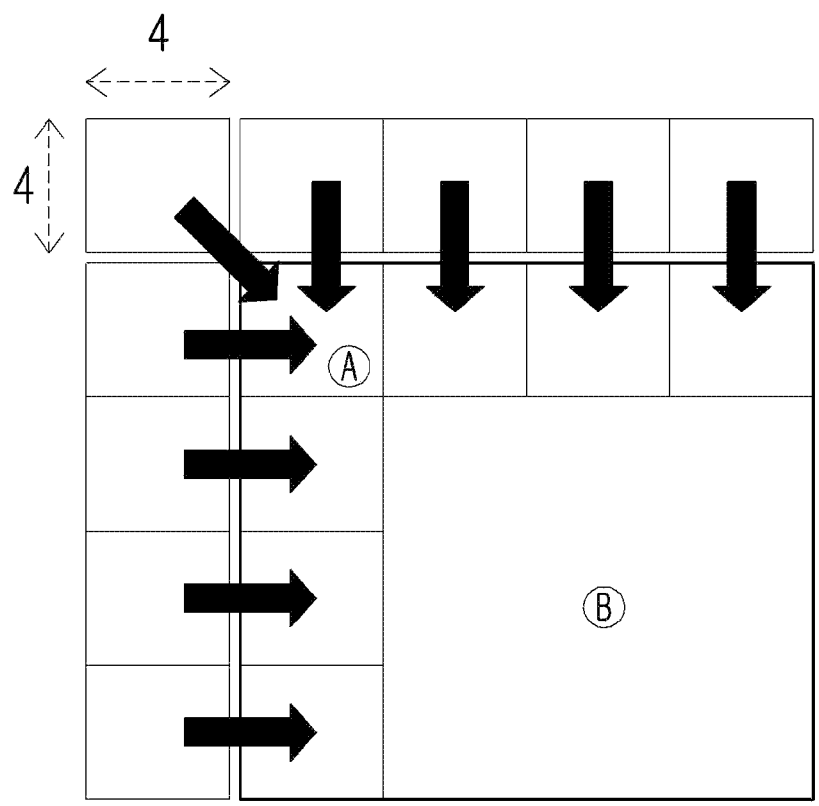
FIG. 17 is a view showing a method of deriving motion prediction information of a sub-block by using a lowest level sub-block according to an embodiment of the present invention.

FIG. 17 is a view showing a method of deriving motion prediction information of a sub-block by using a lowest level sub-block according to an embodiment of the present invention.

In (c) of FIG. 16, when a current block is divided into two asymmetric sub-blocks and motion prediction/compensation for a first sub-block is performed by using motion information of a spatially adjacent block, referring to FIG. 17, motion prediction/compensation for the first sub-block is performed in a unit of the lowest level sub-block of a first sub-block, and thus motion information of the spatially adjacent lowest level sub-block positioned at left or upper or both of the lowest level sub-block may be implicitly derived as motion information of the first sub-block. Herein, a size of the lowest level sub-block may be 4×4. Herein, motion information of a second sub-block may be explicitly derived by using an AMVP mode.

In FIG. 17, motion information of a left-upper lowest level sub-block among lowest level sub-blocks of a first sub-block may be derived by using at least one of motion information of spatially adjacent left, upper, and left-upper lowest level sub-blocks. Herein, motion information of a left-upper lowest level sub-block may use motion information of one lowest level sub-block among spatially adjacent left, upper, and left-upper lowest level sub-blocks, or motion information may be derived on the basis of at least one of an average value, a mode, a weighted sum of up to three adjacent lowest level sub-blocks.

In FIG. 17, motion information of a lowest level sub-block of a first sub-block may be derived by using at least one of a spatially adjacent left or upper lowest level sub-block or both.

In FIG. 17, when motion information is not present in spatially adjacent left or upper lowest level sub-block or both, for motion information of a lowest level sub-block of a first sub-block, motion information may be derived in left or upper lowest level sub-block or both that are adjacent to the spatially adjacent left or upper lowest level sub-block or both.

In FIG. 17, when motion information is not present in spatially adjacent left or upper lowest level sub-block or both, motion information of a lowest level sub-block of a first sub-block may be replaced with motion information of a second sub-block derived by using an AMVP mode.

In FIG. 16, when a current block is divided into two sub-blocks, motion prediction/compensation for a first sub-block may be performed by using motion information of a merge candidate list, and inter-prediction information of a second sub-block may be derived by using at least one inter-prediction method of a skip mode, a merge mode, an AMVP mode, an affine transform formula, and motion prediction/compensation based on bilateral matching, template matching, and OBMC based motion prediction/compensation. Alternatively, motion prediction/compensation for a second sub-block may be performed by using motion information of a merge candidate list, and inter-prediction information of a first sub-block may be derived by using at least one inter-prediction method of a skip mode, a merge mode, an AMVP mode, an affine transform formula, and motion prediction/compensation based on bilateral matching, template matching, and OBMC based motion prediction/compensation.

According to an example described above, by using at least one of motion information of a merge candidate list, motion information of a first sub-block or second sub-block or both for which motion prediction/compensation is performed may be derived in a unit of a lowest level sub-block having a predetermined size.

In (c) of FIG. 16, when a current block is divided into two asymmetric sub-blocks, motion information of a first sub-block may be implicitly derived by using at least one of motion information of a merge candidate list.

In an example, the first piece of motion information of a merge candidate list of a current block may be derived as motion information of the first sub-block.

In another example, motion information of a first sub-block may be derived by using at least one of motion information derived in A0, A1, B0, B1, B2, C3, and H of FIG. 9.

In another example, motion information of a lowest level sub-block positioned at the left of a first sub-block may be derived by using at least one of motion information derived in A0, A1, and B2 of FIG. 9. In addition, motion information of a lowest level sub-block positioned at the upper of a first sub-block may be derived by using at least one of motion information derive in B0, B1, and B2 of FIG. 9.

In FIG. 16, when a current block is divided into two sub-blocks, motion prediction/compensation for a first sub-block may be performed by using motion information used in an AMVP mode, and inter-prediction information of a second sub-block may be derived by using at least one inter-prediction method of a skip mode, a merge mode, an AMVP mode, an affine transform formula, and motion prediction/compensation based on bilateral matching, template matching, and OBMC based motion prediction/compensation. Alternatively, motion prediction/compensation for a second sub-block may be performed by using motion information used in an AMVP mode, and inter-prediction information of a first sub-block may be derived by using at least one inter-prediction method of a skip mode, a merge mode, an AMVP mode, an affine transform formula, and motion prediction/compensation based on bilateral matching, template matching, and OBMC based motion prediction/compensation.

According to an example described above, by using at least one of motion information used in an AMVP mode, motion information of a first sub-block or second sub-block or both for which motion prediction/compensation is performed may be derived in a unit of the lowest level sub-block having a predetermined size.

In (a) of FIG. 16, when a current block is divided into two asymmetric sub-blocks, motion information of a first sub-block may be implicitly derived by using at least one of motion information of a motion vector candidate list used in an AMVP mode.

In an example, the first piece of motion information of a motion vector candidate list used in an AMVP mode of a current block may be derived as motion information of the first sub-block.

In another example, motion information of a first sub-block may be derived by using a zero motion vector.

Hereinafter, a method of deriving intra-prediction information between sub-blocks will be described.

When a current block is divided into at least one of a symmetric or asymmetric sub-block or both, intra-prediction information different between sub-blocks may be derived from each sub-block. Herein, for a sub-block of a current block, different intra-prediction information may be derived in a unit of a lowest level sub-block. A lowest level sub-block may mean the smallest block unit having a predetermined size. A 4×4 block size may be defined as a size of a lowest level sub-block.

In FIG. 16, when a current block is divided into two sub-blocks, intra-prediction information may be derived from a first sub-block (or sub-block A) or a second sub-block (or sub-block B) in a unit of a lowest level sub-block having a predetermined size.

In (c) of FIG. 16, when intra-prediction is performed for a first sub-block by using intra-prediction information of a spatially adjacent block, referring to FIG. 17, motion prediction/compensation for a first sub-block may be performed in a unit of a lowest level sub-block of a first sub-block, and thus intra-prediction information of the spatially adjacent lowest level sub-block positioned at left or upper of the lowest level sub-block or both may be implicitly derived as motion information of the first sub-block. Herein, a size of the lowest level sub-block may be 4×4. Herein, for intra-prediction information of a second sub-block, intra-prediction mode information that minimizes a distortion of the second sub-block may be implicitly derived by using a reference sample adjacent to a current block.

For example, for a distortion, a prediction block of a current block size may be generated by using a reference sample adjacent to the current block, and an intra-prediction mode in which SAD (sum of absolute differences) or SAID (sum of absolute transformed differences) or both become minimum in a practical second sub-block area may be derived as an intra-prediction mode of a second sub-block.

In FIG. 17, an intra-prediction mode of a left-upper lowest level sub-block among lowest level sub-blocks of a first sub-block may be derived by using at least one of intra-prediction mode information of spatially adjacent left, upper, and left-upper lowest level sub-blocks. Herein, as intra-prediction mode information of a left-upper lowest level sub-block, intra-prediction mode information of one lowest level sub-block may be used among spatially adjacent left, upper, and left-upper lowest level sub-blocks. Alternatively, intra-prediction mode information of a current lowest level sub-block may be derived by using at least one of an average value, a mode, a weighted sum of up to three pieces of intra-prediction mode of neighbor lowest level sub-blocks.

In FIG. 17, intra-prediction mode information of a lowest level sub-block of a first sub-block may be derived by using at least one of a spatially adjacent left or upper lowest level sub-block or both.

In FIG. 17, when intra-prediction mode information is not present in a spatially adjacent left or upper lowest level sub-block or both, intra-prediction mode information of a lowest level sub-block of a first sub-block may be derived in a lowest level sub-block adjacent to the spatially adjacent left or upper lowest level sub-block or both. The neighbor may be the left or upper or both sides.

In FIG. 17, when intra-prediction mode information is not present in a spatially adjacent left or upper lowest level sub-block or both, intra-prediction mode information of a lowest level sub-block of a first sub-block may be replaced with intra-prediction mode information derived in a second sub-block.

When generating an intra-prediction block of a first sub-block, in a unit of a lowest level sub-block, a final prediction block may be generated by using a weighted sum of prediction blocks after generating at least one intra-prediction block.

For example, according to a method described above, a prediction block (pred_1) may be generated by using an intra-prediction mode that is implicitly derived in a first sub-block in a unit of a lowest level sub-block, and then a prediction block (pred_2) may be generated by applying an intra-prediction mode derived in the second sub-block to a lowest level sub-block of the first sub-block. Subsequently, a prediction block of lowest level sub-block of the first sub-block may be generated by a weighted sum or average value of both of pred_1 or pred_2 or both.

Hereinafter, a method of deriving combined intra/inter-prediction information between sub-blocks will be described.

When a current block is divided into at least one of a symmetric or asymmetric sub-block or both, intra-prediction or inter-prediction information or both different between sub-blocks may be derived from each sub-block. Herein, for a sub-block of a current block, intra-prediction or inter-prediction information or different intra-prediction and inter-prediction information may be derived in a unit of a lowest level sub-block. A lowest level sub-block may mean the smallest block unit having a predetermined size. A 4×4 block size may be defined as a size of a lowest level sub-block.

In FIG. 16, when a current block is divided into two sub-blocks, intra-prediction information may be derived from a first sub-block, and inter-prediction information may be derived from a second sub-block.

In FIG. 16, when a current block is divided into two sub-blocks, intra-prediction information in a unit of a lowest level sub-block may be derived from a first sub-block, and inter-prediction information may be derived from a second sub-block.

In FIG. 16, when a current block is divided into two sub-blocks, intra-prediction information may be derived from a first sub-block, and inter-prediction information in a unit of a lowest level sub-block may be derived from a second sub-block.

In FIG. 16, when a current block is divided into two sub-blocks, intra-prediction information in a unit of a lowest level sub-block may be derived from a first sub-block, and inter-prediction information in a unit of a lowest level sub-block may be derived from a second sub-block.

In FIG. 16, when a current block is divided into two sub-blocks, inter-prediction information may be derived from a first sub-block, and intra-prediction information may be derived from a second sub-block.

In FIG. 16, when a current block is divided into two sub-blocks, inter-prediction information in a unit of a lowest level sub-block may be derived from a first sub-block, and intra-prediction information may be derived from a second sub-block.

In FIG. 16, when a current block is divided into two sub-blocks, inter-prediction information may be derived from a first sub-block, and intra-prediction information in a unit of a lowest level sub-block may be derived from a second sub-block.

In FIG. 16, when a current block is divided into two sub-blocks, inter-prediction information in a unit of a lowest level sub-block may be derived from a first sub-block, and intra-prediction information in a unit of a lowest level sub-block may be derived from a second sub-block.

Figure 18:
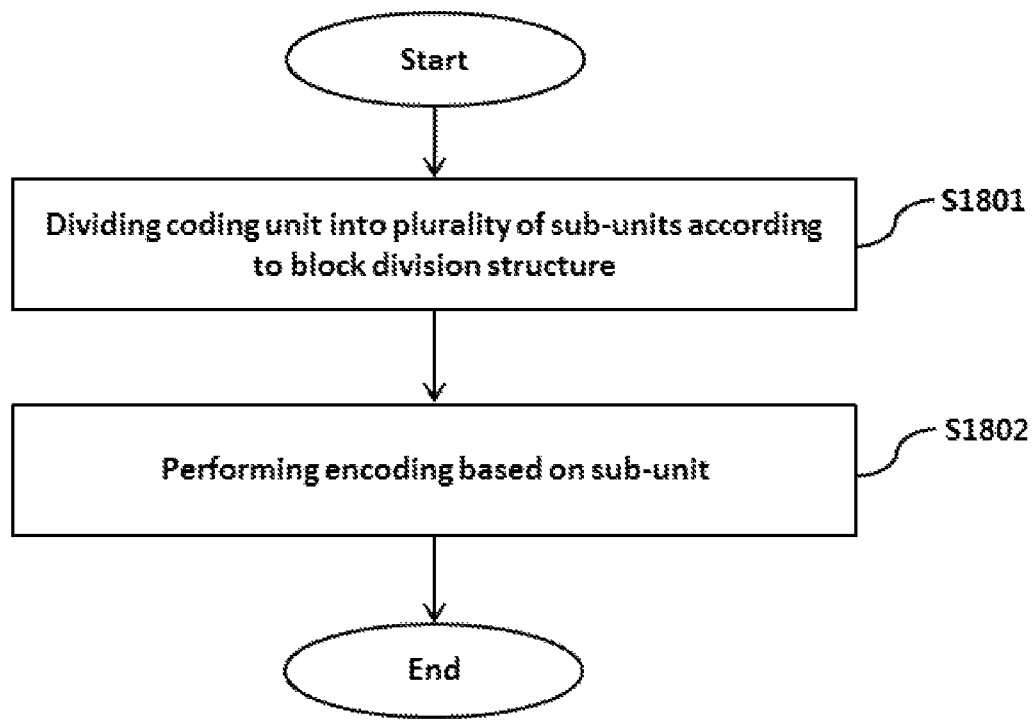
FIG. 18 is a view of a flowchart of a video encoding method an according to an embodiment of the present invention.

FIG. 18 is a view of a flowchart of a video encoding method an according to an embodiment of the present invention.

Referring to FIG. 18, in S1801, the encoder may divide a coding unit into a plurality of sub-units according to a block division structure.

Meanwhile, a block division structure may be a block division structure where division is performed such that at least one sub-unit having a predetermined block form is included other than a square form and a rectangular form.

Meanwhile, the block division structure may be a block division structure where division is performed such that the coding unit is divided to include a triangular-form sub-unit.

Meanwhile, the triangular form may be at least one of a triangular form obtained by dividing by a diagonal boundary from the left-upper to the right-lower of the coding unit, and a triangular form obtained by dividing by a diagonal boundary from the right-upper to the left-lower of the coding unit.

Meanwhile, the block division structure may be determined on the basis of a flag representing whether or not the coding unit is divided.

Meanwhile, the block division structure may be determined on the basis of a flag representing whether or not the coding unit is divided and an index representing a division type of the sub-unit.

Meanwhile, a division type of the sub-unit may represent a division direction of the sub-unit.

Subsequently, in S1802, the encoder may perform encoding based on the sub-unit.

Meanwhile, the encoder may perform encoding by performing prediction of at least one of intra-prediction and inter-prediction based on the sub-unit. In addition, the encoder may perform encoding by performing at least one of transform and quantization based on the sub-unit. In addition, the encoder may perform encoding in a lowest level sub-unit of the sub-unit, A recording medium according to the present invention may store a bitstream generated by a video encoding method, wherein the method includes: dividing a coding unit into a plurality of sub-units according to a block division structure; and performing encoding based on the sub-unit, wherein the block division structure includes at least one sub-unit having a predetermined block form other than square and rectangle forms.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:
1. A method of decoding a video, the method comprising:
determining a partitioning shape of a coding unit determined to be geometrically partitioned from among a plurality of partitioning shape candidates, the plurality of partitioning shape candidates comprising an asymmetrically divided shape;
constructing a merge candidate list of the coding unit including merge candidates;
determining a first merge candidate and a second merge candidate from the merge candidates in the merge candidate list of the coding unit, wherein the first merge candidate is different from the second merge candidate;

deriving first geometrical partition motion information from either L0 motion information or L1 motion information of the first merge candidate;

deriving second geometrical partition motion information from either L0 motion information or L1 motion information of the second merge candidate; and decoding the coding unit based on the first geometrical partition motion information, the second geometrical partition motion information and the partitioning shape of the coding unit.

2. The method of claim 1, wherein whether to geometrically partition a coding unit is determined based on a flag representing whether or not the coding unit is geometrically partitioned.

3. The method of claim 2, wherein the flag representing whether or not the coding unit is geometrically partitioned is determined based on coding parameters of the coding unit.

4. The method of claim 1, wherein the partitioning shape is determined based on an index representing a partitioning shape of the coding unit.

5. The method of claim 4, wherein a partition direction and a partition distance of the coding unit is derived from the index representing the partitioning shape of the coding unit.

6. The method of claim 1, wherein the first merge candidate and the second merge candidate are determined based on first merge index information and second merge index information of the coding unit.

7. A method of encoding a video, the method comprising:

determining a partition shape of a coding unit determined to be geometrically partitioned from among a plurality of partitioning shape candidates, the plurality of partitioning shape candidates comprising an asymmetrically divided shape;

constructing a merge candidate list of the coding unit including merge candidates;

determining a first merge candidate and a second merge candidate from the merge candidates in the merge candidate list of the coding unit, wherein the first merge candidate is different from the second merge candidate;

deriving first geometrical partition motion information from either L0 motion information or L1 motion information of the first merge candidate;

deriving second geometrical partition motion information from either L0 motion information or L1 motion information of the second merge candidate; and encoding the coding unit based on the first geometrical partition motion information, the second geometrical partition motion information and the partitioning shape of the coding unit.

8. The method of claim 7, wherein whether to geometrically partition a coding unit is determined based on a flag representing whether or not the coding unit is geometrically partitioned.

9. The method of claim 8, wherein the flag representing whether or not the coding unit is geometrically partitioned is determined based on coding parameters of the coding unit.

10. The method of claim 7, wherein an index representing a partitioning shape of the coding unit is encoded based on the partitioning shape.

11. The method of claim 1, wherein the index representing the partitioning shape of the coding unit represents a partition direction and a partition distance of the coding unit.

12. The method of claim 7, wherein first merge index information and second merge index information of the coding unit is generated by encoding the first merge candidate and the second merge candidate.

13. A computer readable recording medium storing a bitstream generated by a video encoding method, wherein the bitstream includes encoded video data, and
wherein the encoding method includes:

determining a partitioning shape of a coding unit determined to be geometrically partitioned from among a plurality of partitioning shape candidates, the plurality of partitioning shape candidates comprising an asymmetrically divided shape;

constructing a merge candidate list of the coding unit including merge candidates;

determining a first merge candidate and a second merge candidate from the merge candidates in the merge candidate list of the coding unit, wherein the first merge candidate is different from the second merge candidate;

deriving first geometrical partition motion information from either L0 motion information or L1 motion information of the first merge candidate;

deriving second geometrical partition motion information from either L0 motion information or L1 motion information of the second merge candidate; and encoding the coding unit based on the first geometrical partition motion information, the second geometrical partition motion information and the partitioning shape of the coding unit.

* * * * *